US011615313B1

(12) United States Patent
Ansel

(10) Patent No.: US 11,615,313 B1
(45) Date of Patent: Mar. 28, 2023

(54) USING A VALUE FOR A DOMAIN NAME DETERMINED BY A MACHINE LEARNING ENGINE

(71) Applicant: Go Daddy Operating Company, LLC, Scottsdale, AZ (US)

(72) Inventor: Jason Ansel, Seattle, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 16/863,641

(22) Filed: Apr. 30, 2020

Related U.S. Application Data

(63) Continuation of application No. 15/482,492, filed on Apr. 7, 2017, now abandoned.

(51) Int. Cl.
*G06N 3/08* (2006.01)
*G06N 3/084* (2023.01)
*G06Q 30/02* (2023.01)
*G06N 3/063* (2023.01)
*G06Q 30/0283* (2023.01)

(52) U.S. Cl.
CPC ........... *G06N 3/084* (2013.01); *G06N 3/0635* (2013.01); *G06Q 30/0278* (2013.01); *G06Q 30/0283* (2013.01)

(58) Field of Classification Search
None
See application file for complete search history.

(56) References Cited

U.S. PATENT DOCUMENTS

| 8,447,702 B2 * | 5/2013 | Nicks | G06F 16/90335 |
| | | | 705/306 |
| 11,444,978 B1 * | 9/2022 | Liao | G06F 40/279 |
| 2017/0171151 A1 * | 6/2017 | Raemy | G10L 15/16 |

* cited by examiner

*Primary Examiner* — Daniel C Puentes
(74) *Attorney, Agent, or Firm* — Greenberg Traurig, LLP

(57) ABSTRACT

A training set may be created to train a machine learning engine, such as an artificial neural network (ANN), to value a target domain name using data from previously sold domain names. The training set may comprise a plurality of word features vector of real numbers (information related to the words or tokens within the sold domain names), a plurality of word embedding vector of real numbers (word embedding of the words within the sold domain names), a plurality of context embedding vector of real numbers (sale context, i.e., location and date of a sale of a sold domain name), a plurality of DNS embedding vector of real number (DNS information of the sold domain name) and/or a plurality of domain name features vector of real numbers (data regarding the sold domain name). The ANN may then be trained on the training set, using the methods of gradient descent and back propagation, to value a target domain name.

13 Claims, 18 Drawing Sheets

Artificial Neural Network (ANN) 160, Recurrent Neural Network (RNN) 300 and/or Neural Network (NN) 310

PERCEPTRON

X1, X2, X3 and X4 are equal to 0 or 1, output is equal to 0 or 1 if $\sum_j W_j X_j \leq$ threshold then the Output = 0
if $\sum_j W_j X_j >$ threshold then the Output = 1

SIGMOID NEURONS

X1, X2, X3 and X4 are 0 to 1, inclusive
Output is between 0 and 1, inclusive

σ(z) = $1/1+e^{-z}$ $1/1+(-\sum_j w_j x_j - b)$

USING A VALUE FOR A DOMAIN NAME DETERMINED BY A MACHINE LEARNING ENGINE

FIELD OF THE INVENTION

The present invention generally relates to the fields of creating a training set using a plurality of sold domain names, training a machine learning engine using the training set, estimating a value of a target domain name using the machine learning engine and using the estimated value of the target domain name.

SUMMARY OF THE INVENTION

The present invention provides methods for 1) creating a training set for a machine learning engine to value a target domain name using a database of a plurality of sold domain names; 2) training the machine learning engine on the created training set to value the target domain name; 3) determining a value of a target domain name using the machine learning engine trained on the training set and 4) using the predicted value of the target domain name determined by the machine learning engine. In preferred embodiments, these methods, once set-up by a user, are performed automatically and without human intervention. Users are preferably able to monitor the processes and adjust values (such as a learning rate of the machine learning engine), but each of the steps themselves, once started, are preferably run automatically and entirely by a Domain Name Valuation System (DMVS) without human intervention.

Creating a Training Set to Train a Machine Learning Engine to Value a Target Domain Name Artificial neural networks (ANNs) may be trained on a training set representative of the data that will later be input into the ANN during actual use. Thus, a large database comprising previously sold domain names is required to train an ANN to value a new target domain name. During training, weights for all of the inputs to the artificial neurons (or nodes) are adjusted to improve the response of the ANN. The training set may comprise a large number of previously sold domain names so the ANN may be trained (one sold domain name at a time) using each previously sold domain name in the database. After the ANN has been trained using all of the sold domain names (one epoch) the process may be repeated many times (in other words there will be many epochs of training) to train the ANN.

In addition to the sold domain names, the training set may also include for each sold domain name, as non-limiting examples, a sale platform, a sale date and a sale price. Other databases (WHOIS, nameservers, online sources, etc.) with relevant information regarding a value of a sold domain name may also be used in creating a training set that may be used to train an ANN.

The training set is preferably created so that the data is in a format that is easily read and used during the training of the ANN. Thus, all data the ANN may need during training is preferably calculated and stored in the training set. This hopefully saves the Domain Name Valuation System (DNVS) from having to recalculate values over and over every time a sold domain name is used during training. In other words, the data required for training the ANN is preferably calculated once and stored in the training set as opposed to recalculating the same values over and over during training of the ANN. The following description will described the data that is stored as part of the training set in the database and how it is collected or calculated.

In an embodiment of the invention, the DNVS may be used to create the training set. The training set may be used by the DNVS to train a machine learning engine, such as an ANN, to value a target domain name. While the machine learning engine may be of any type, in a preferred embodiment and in discussing the invention throughout the specification, the machine learning engine will be assumed to be an ANN. The ANN may comprise one or more neural networks (NN) one or more recurrent neural networks (RNN) and/or one or more convolutional neural networks (CNN).

The DNVS preferably has access to read from a large database running on a hardware server, wherein the database comprises a plurality of sold domain names. The DNVS may read each sold domain name from the database and tokenize each sold domain name into one or more s_tokens. The DNVS may use all or any number of the s_tokens. In a preferred embodiment, the DNVS only uses up to four s_tokens in any given sold domain name. The DNVS may select the four s_tokens using any desired selection method, such as the first four s_tokens or the first three s_tokens and the last s_token.

The DNVS may map each s_token in a sold domain name, having a plurality of associated word features, to a word features vector of real numbers. Non-limiting examples of associated word features are the number of characters in the s_token, whether the s_token is in an English dictionary (using one or more other language dictionaries may also be used), whether the s_token is in a places dictionary, whether the s_token is in a name dictionary and/or a popularity (possibly determined by a number of appearances) of the s_token in a selected body of text (such as in all sold and/or registered domain names). Any number of associated word features may be used.

As a non-limiting example, a word feature vector of real numbers for the s_token "example" may be (7, 0, 0, 0, 38, 0.2, 0.5, 0, 0, 1, 1, 1, 0.9, 0.2, 0.4, 0.3, 99, 2, 3, 1, 0, 0, 0, 2, 5, 6, 34, 1, 0.99, 0.2, 0.1, 2, 0.3, 0.3, 8, 5, 3, 2, 0.9, 4). In this example, the word feature vector of real numbers comprises 40 dimensions and each dimension has a value that represents an answer or response to one of the dimensions in the word features vector of real numbers. Thus, if the first dimension for the word feature vector or real numbers is for the number of characters in the s_token, and "example" has seven characters, the first value for the first dimension in the word feature vector of real numbers may be seven, as illustrated in this example. The remaining values in each of the remaining word features vectors of real number may be determined in a similar manner. In this way a word feature vector of real numbers may be created for every s_token in every sold domain name. This mapping of s_tokens to word feature vectors of real numbers positions similar s_tokens near other similar s_tokens in high dimensional space, while positioning dissimilar tokens farther apart from each other in high dimensional space.

As another example, if the associated word feature is whether the s_token is in a places dictionary, the places dictionary may be searched to determine if the s_token is an entry in the dictionary as a location. Alternatively, the s_token may be searched for in a universal dictionary and one or more word features may be determined based on information read about the s_token from the universal dictionary. It should be appreciated that this process will tend to map s_tokens that share more of the same answer closer together in high dimensional space than s_tokens that share fewer of the same answers. The created word feature vectors of real numbers, for each sold domain name, may be saved in the database as part of the training set.

The DNVS also preferably has access to read from a large database running on a hardware server, wherein the database comprises a plurality of registered domain names. The DNVS may read the registered domain names and tokenize each registered domain name into one or more r_tokens. The DNVS may map each s_token and/or each r_token, based on one or more neighboring words of the s_token or the r_token, to a word embedding vector of real numbers. In other words, the word embedding uses the s_tokens and/or the r_tokens in the sold domain names and/or the registered domain names to try to predict their neighboring words. This process takes advantage of the fact that similar words, in domain names and bodies of text in general, tend to be neighbors with the same words. The word embedding of the s_tokens and/or the r_tokens thus also tries to map similar s_tokens and/or r_tokens closer to each other in high dimensional space than to s_tokens and/or r_tokens that are dissimilar. Thus, the tokens "man" and "male" may be mapped very close to each other, since they are synonyms, "man" and "woman" may be mapped a little further apart, since they are antonyms, and "man" and "the" may be mapped even further apart, since one is a noun and one is an article of speech. However, all of these words might be mapped closer together in high dimensional space than words from different languages. The word embedding vector of real numbers for each s_token and each r_token may be saved in the database as part of the training set.

The DNVS may map each sold domain name, having an associated context, to a context embedding vector of real numbers. While the word features vector of real numbers and word embedding vector of real numbers dealt with one or more words tokenized from the sold domain names and registered domain names, the context embedding vector of real numbers deals with the sold domain name itself. The context embedding vector of real numbers preferably maps information regarding the sale of the sold domain name. As specific examples, the context embedding will specify a platform where the sold domain name was sold and preferably a time (such as a year) when the sold domain name was sold. This information may also be mapped such that associated contexts that are similar, such as "GoDaddy Auction 2005" and "GoDaddy Auction 2006" are mapped close together, while "GoDaddy Action 2005" and "Competitor #36 2012" will be mapped further apart. The context embedding vector of real numbers for each sold domain name may be saved in the database as part of the training set.

The DNVS may map each sold domain name, having an associated DNS context, to a DNS embedding vector of real numbers. The DNS context refers to those features related to the domain name system (DNS) used by the sold domain name. As non-limiting examples, the DNS context may comprise the names of the nameservers used by the sold domain name and/or the names of the Internet Service Providers (ISPs) used by the sold domain name. The DNS embedding vector or real numbers for each sold domain name may be saved in the database as part of the training set.

The DNVS may also map each sold domain name, having a plurality of domain name features, to a domain name features vector of real numbers. The domain name features refers to features of the sold domain name, such as whether the TLD is ".com" for the sold domain name, how many characters are in the sold domain name, how many words are in the sold domain name, how many numbers are in the sold domain name, how many hyphens are in the sold domain name, etc. The domain name features vector of real numbers for each sold domain name may be saved in the database as part of the training set.

Thus, as a result of this process, the training set is stored in the database, wherein the training set comprises the word features vector of real numbers, the word embedding vector of real numbers, the context embedding vector of real numbers, the DNS embedding vector of real numbers and the domain name features vector of real numbers. This training set may then be used by the DNVS to train the ANN, comprising a plurality of nodes, i.e., artificial neurons, to enable the ANN to value a target domain name. The ANN may be able to value the target domain name even though the target domain name was never used in creating the training set.

Training a Machine Learning Engine to value a Target Domain Name

Once the training set has been determined and stored in the database, the DNVS may train the ANN. Training the ANN involves reading the data from the training set and applying the data for a sold domain name to the ANN. The ANN will produce a predicted value for the sold domain name. As the sold domain name has a known prior sale price, the error of the ANN in determining the sale price may be calculated. Using backward propagation of errors in conjunction with optimization methods, such as gradient descent, the weights and/or biases for each input to each node (artificial neuron) may be adjusted to train the ANN. The process may be repeated for additional sold domain names. Once all of the sold domain names have been processed (an epoch), the process may be repeated over and over using the same sold domain names in the training set.

In an embodiment, the DNVS may then read the training set from the database. While the DNVS may read all of the training set at once, it may be more efficient for the DNVS to read only the portions of the training set needed to stay ahead of the training process. The DNVS throughout the training process may be continually reading different portions of the training set as needed. Thus, the DNVS may read from the training set all, or parts of the training set as needed, of 1) a word features vectors of real numbers for each s_token in each sold domain name in a plurality of sold domain names; 2) a word embedding vector of real numbers for each s_token in each sold domain name in the plurality of sold domain names; 3) a context embedding vector of real numbers for each sold domain name in the plurality of sold domain names; 4) a DNS embedding vector of real numbers for each sold domain name in the plurality of sold domain names; and 5) a domain name features vector of real numbers for each sold domain name in the plurality of sold domain names. While these are the preferred vectors of real numbers, not all of these vectors of real numbers need to be used in every embodiment and/or additional vectors of real number may also be used with the described vectors of real numbers. In addition, while each of these vectors is described individually, these vectors of real numbers and/or other undescribed vectors of real numbers may be stored separately or combined when stored in the database as the training set.

As an initial condition in preparing the ANN for training, all of the nodes (artificial neurons) may have all of their weights for each input and possibly their bias set to a random number. As a non-limiting example, all of the weights for every input to every node may be randomly set to between 0 and 1, inclusive. An learning rate for the ANN may also be selected using heuristic or trial by error methods.

The DNVS may apply all of the vectors of real numbers for a particular, i.e., single, sold domain name to the ANN at the same time. Thus, if the sold domain name is "hatsforcats.com," the DNVS may apply to the ANN 1) the word features vectors of real numbers for "hats," "for" and "cats" (preferably to different hidden layers in a RNN within the ANN); 2) the word embedding vectors of real numbers for "hats," "for" and "cats" (again, preferably to different hidden layers in a RNN within the ANN); 3) the context embedding vector of real numbers for the sold domain name (where and when the sold domain was sold); 4) the DNS embedding vector of real numbers for the sold domain name (data regarding the DNS system the sold domain name used); and/or 5) the domain name features vector of real numbers.

If, as an example, the ANN (and specifically the RNN) is designed to handle a number of s_tokens greater than the actual number of s_tokens in the sold domain name currently being used to train the ANN, default values (all 0's, all 1's, all 0.5's or a random selection of 0's, 0.5's and/or 1's) may be used as a values or real numbers and applied to the ANN. Thus, if the sold domain name "hatsforcats.com" has three s_tokens, i.e., "hats," "for" and "cats," but the ANN is designed for four s_tokens, a default vector of real numbers may be used as a default vector of real numbers for the fourth s_token.

It should be noted that the word features vectors of real numbers and the word embedding vectors of real numbers may be applied to the same corresponding nodes in the same hidden layer, to different nodes in the same layer or to nodes in completely different layers. As a specific example, the word features vector of real numbers and the word embedding vector of real numbers for the s_token "hats" may both be applied to the same group of nodes (using different inputs for each node), may be applied to different nodes in, for example, the first hidden layer or may be applied to different layers, such as a first hidden layer and a fifth hidden layer. However, the order that the s_tokens appear in the sold domain name is preferably the same order that the word features vectors of real numbers and word embedding vectors of real numbers are applied to the hidden layers in the ANN.

At this point in the process there may be hundreds or thousands of inputs from the various vectors of real numbers applied to the ANN (and, if used, the internal RNN). The ANN may then allow all of the nodes (artificial neurons) to process their inputs and each layer may forward their outputs to the inputs of the next layer of nodes. The ANN and internal RNN may have any desired number of hidden layers. In a preferred embodiment, the RNN may have four hidden layers and a NN may have two hidden layers. As the power of available computing processes is likely to increase in the future, it is foreseen that additional hidden layers and/or additional nodes per layer in the RNN and/or the NN may become desirable. Additional hidden layers and/or nodes per layer may add to the accuracy of the ANN (possibly with diminishing returns), but will also add to the time and computational power needed to operate (train and use) the ANN.

The ANN may have 1,000's of outputs (while a number around 1,000 is a preferred number of outputs now, the number of desired outputs is likely to increase in the future as computers become more powerful). The 1,000's of outputs of the ANN may be applied to a regression function that may be used to predict a value for the sold domain name.

The predicted value for the sold domain name from the ANN may be compared to the actual sale price of the sold domain name that is stored as part of the training set. Using any desired technique, such as hill climbing (gradient descent) and/or back propagation, the DNVS may simultaneously optimize the word embeddings and the logistic regression parameters and the weighted inputs of the nodes in the ANN. Noise-contrastive estimation (NCE) loss, i.e., random sampling may also be used to increase the overall speed of the process.

The above described process may have been for the sold domain name of "hatsforcats.com." The above process may be repeated for some percentage or all of the remaining sold domain names in the training set. Specifically, a predicted value for each sold domain name may be determined, an error calculated using the actual sale price, using back propagation and/or gradient descent the nodes are updated (typically the weights assigned to each input and possibly a bias of the node) and the regression function may be updated.

One epoch occurs when all of the desired sold domain names have been used to train the ANN. It will likely take many epochs, using the above described process, to fully train the ANN. The ANN may be trained using any desired number of epochs. As examples, the ANN may be continued to be trained (more epochs) until the ANN reaches a desired consistency and accuracy or until the consistency and accuracy start to get worse, possibly due to over training the ANN.

A Machine Learning Engine Valuing a Target Domain Name

Once the DMVS has trained the ANN, the ANN may be used to value one or more target domain names. The target domain names may be registered or available and generated by the DMVS, by a customer or by the DMVS using data either directly from the customer or data found online about the customer. The value found for the target domain name may be used for any desired purpose. As non-limiting examples, the value may be displayed next to the target domain name to inform a customer of a predicted or estimated value for the target domain name. As a predicted sale price (value of the target domain name) may be heavily influenced by the method (sale platform) used to sell the domain name, the method used (sale platform) to calculate the value of the target domain name may also be displayed with the domain name and the predicted value. The ANN, once trained, may be used to value any number of different target domain names over any desired time period.

The process for using the ANN to value a target domain name is similar to the part of the process of training the ANN on a single sold domain name. The DNVS may tokenize the target domain name into one or more words, preferably using the same process used to tokenize the sold domain names used to train the ANN.

The DNVS may map each word, having a plurality of associated word features, in the one or more words to a word feature vector of real numbers. The process previously described for mapping a s_token to a word features vector of real numbers may be used to map each word from the target domain name to a word feature vector of real numbers.

The DNVS may map each word in the target domain name to a word embedding vector of real numbers. The DNVS may accomplish this by matching each word in the target domain name to a same s_token and then assigning each word from the target domain name the corresponding word embedding vector of real numbers. Thus, if a word in a target domain name is "bike," that word may be mapped to a word embedding vector or real numbers previously determined for the s_token of "bike."

The DNVS may map the target domain name to a context embedding vectors of real numbers in a similar manner as done for the sold domain names in creating the training set. The DNVS may map the target domain name, having a plurality of domain name features, to a domain name features vector of real numbers in a similar manner as done for the sold domain names in creating the training set.

The DNVS may apply a plurality of word feature vectors of real numbers for the target domain name to a RNN, wherein each word feature vector of real numbers in the plurality of word feature vectors of real numbers may be applied to a different hidden layer in the RNN.

The DNVS may apply a plurality of word embedding vectors of real numbers for the target domain name to the RNN, wherein each word embedding vector of real numbers in the plurality of word embedding vectors of real numbers is applied to a different hidden layer in the RNN. In this embodiment, the ANN may comprise the RNN and a NN and the RNN feeds into the NN.

The DNVS may apply, the context embedding vectors of real numbers for the target domain name to the NN. The DNVS may apply the domain name features vector of real numbers for the target domain name to the NN. The ANN may feed its outputs to a regression function that then generates a predicted value for the target domain name.

This process may be repeated for the same domain name, but using a different context embedding, i.e., location and/or time of the sale. This allows a user to see predicted sale prices for two or more different sale locations and/or times. In a preferred embodiment, the DNVS displays on a client device operated by a user at the same time two or more locations and a corresponding two or more predicted sales price to allow for easy comparison by the user.

The DNVS may also use the ANN to calculate a likely sale price range (instead of just a single sale price) and/or a level of certainty related to the predicted sale price. A higher level of certainty or confidence may be indicated in the predicted sale price of the target domain name when there are many similar sold domain names to the target domain name that were sold within a tight band and with few or no outliers. Likewise, a lower level of certainty or confidence may be indicated in the predicted sale price of the target domain name when there are few similar sold domain names to the target domain name and/or the similar domain names were sold in a wide range of sale prices and/or had many outliers.

Using a Value of a Domain Name Predicted by a Machine Learning Engine

Once the training set has been created, the ANN trained using the training set and the ANN capable of predicting a value for a target domain name, the DNVS may use this capability in a number of different ways.

As an example, the DNVS may generate a plurality of target domain names for a customer, preferably based on information about the customer or information provided by the customer. The DNVS may then use the ANN to determine a value for each target domain name. The DNVS may then display each target domain name next to the value for the target domain name on a client device of the customer.

In another embodiment, the DNVS may only display the most valuable target domain names to the customer and not display one or more target domain names that are less valuable or that have a value below a predetermined cutoff value. The DNVS may, for example, have space to display five target domain names and thus may display the five target domain names having the five highest values while not displaying the other target domain names.

In another embodiment, the DNVS may issue a certificate for a target domain name that the DNVS determined the target domain name has a stated calculated value. This may be used for appraisals of domain names or for assurances to a person wishing to purchase the domain name from the domain name registrant.

In another embodiment, the DNVS may predict a range of sale prices for the domain name and/or provide a certainty level of the predicted value provided for a target domain name.

It should be appreciated that the above described processes of creating a training set for the ANN, training the ANN using the training set to value the target domain name, valuing the target domain name using the trained ANN and using the predicted value for the target domain name are, once set-up, performed automatically (defined to mean without human intervention). These processes are computationally expensive, taking even very powerful computers hours or even days to complete and are thus beyond human's abilities to perform manually.

In addition, the ANN once trained as described is able to predict values of target domain names, on average, better than the best humans are able to predict sales prices for domain names. The above described technologies have been tested and shown to produce predicted sale prices that are much closer to actual sale prices of domain names on average than human experts on domain name pricing can predict. Thus, a properly trained ANN is able to automatically value domain names on average better than a human expert.

The above features and advantages of the present invention will be better understood from the following detailed description taken in conjunction with the accompanying drawings.

DETAILED DESCRIPTION

Figure 1:
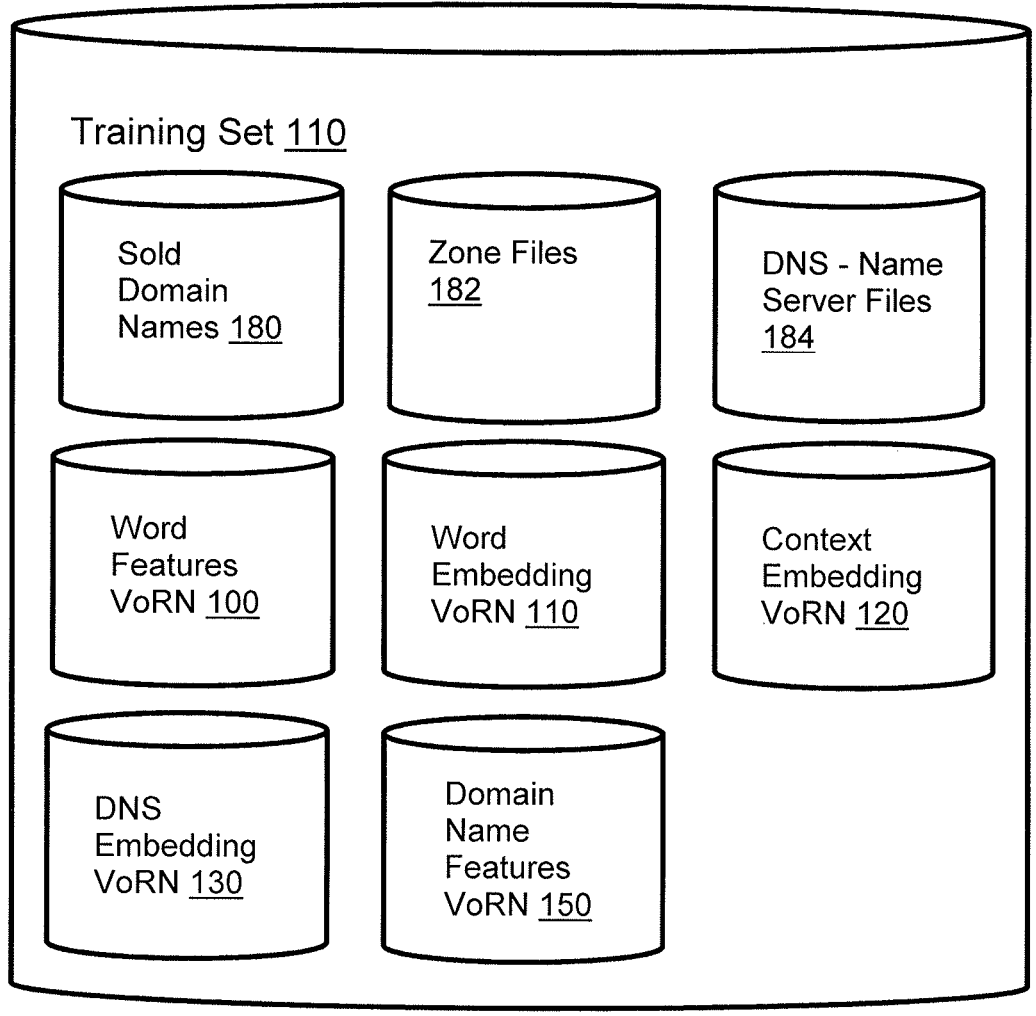
FIG. 1 is a block diagram of a Domain Name Valuation System (DNVS) comprising a database storing a training set and data to create a training set, an artificial neural network (ANN), a regression analysis, model or function (any of which are herein referred to as a regression function) and a predicted or estimated value of a domain name 175 that may be used to practice the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A computer network is a collection of links and nodes (e.g., multiple computers and/or other client devices connected together) arranged so that information may be passed from one part of the computer network to another over multiple links and through various nodes. Examples of computer networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users on client devices. Hundreds of millions of people around the world have access to client devices connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Internet are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single server and are prepared and maintained by a single individual or entity (although websites residing on multiple servers is certainly possible). Menus, links, tabs, etc. may be used to move between different web pages within the website or to move to a different website.

Websites may be created using HyperText Markup Language (HTML) to generate a standard set of tags that define how the webpages for the website are to be displayed. Websites may comprise titles, tags and text. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user on the client device. The user may then view other webpages at the same website or move to an entirely different website using the browser.

Some Internet users, typically those that are larger and more sophisticated, may provide their own hardware, software, and connections to the Internet. Many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server files are stored within the registry, and a registrar is the authoritative source for the contact information related to the domain name. Such registries are referred to as "thin" registries. Most domain names having a gTLDs are organized through a Shared Registration System (SRS) based on their TLD.

A domain name registrant is hereby defined to be a person or entity that is in the process of registering a domain name or has already registered a domain name. The domain name registrant may use a client device, such as, as non-limiting examples, a cell phone, PDA, tablet, laptop computer, or desktop computer to access a website (such as a website of a domain name registrar) via a computer network, such as the Internet.

The process for registering a domain name with .com, .net, .org, and some other TLDs allows a domain name registrant to use an ICANN-accredited domain name registrar to register their domain name. If a domain name registrant, for example John Doe, wishes to register the domain name "mycompany.com," John Doe may initially determine whether the desired domain name is available by contacting a domain name registrar.

The domain name registrar may have a website having a plurality of webpages. The website is hosted or operated from a server. The server may be, as a non-limiting example, one or more Dell PowerEdge(s) © rack server(s) although other types of servers or combinations of one or more servers may be used. The webpages may have one or more display fields as well as one or more data entry fields. The data entry fields allow the domain name registrant to enter data into the website from a client device.

The domain name registrant may contact the domain name registrar using the website of the domain name registrar and typing the desired domain name into a field on the website created for this purpose. Upon receiving the request from the domain name registrant, the domain name registrar may ascertain whether "mycompany.com" has already been registered by, as a non-limiting example, checking with the Registry associated with the TLD for the domain name. The results of the search may be displayed on the website to thereby notify the potential domain name registrant of the availability of the domain name. If the domain name is available, the domain name registrant may proceed with the registration process. If the domain name is not available for registration, the domain name registrant may keep selecting alternative domain names until an available domain name is found.

A domain name registrant may create a domain name account with a domain name registrar. As the domain name registrar will have a plurality of customers, i.e., domain name registrants, the domain name registrar will manage a plurality of registrant accounts. Each registrant account, is protected, such as, as non-limiting examples, by requiring a user name and a password and/or a biometric from the domain name registrant. The domain name account will hold the information of all of the domain names registered to the domain name registrant with the domain name registrar (the domain name registrant may have domain names with other domain name registrars) and the other products and services the domain name registrant has with the domain name registrar.

As non-limiting examples, a registrant account may list one or more domain names registered to the account holder (domain name registrant), one or more website hosting services of the domain name registrant and one or more email accounts of the domain name registrant. The domain name registrar has access to the registrant account of the domain name registrant and thus knows what domain names and what products and services are registered to and used by the domain name registrant.

A domain name aftermarket is a process by which domain names may be bought and sold after the domain names were previously registered. In a domain name aftermarket, prices are set by the market (negotiated between buyer and seller, list prices set by a seller, or by an auction process). The domain name aftermarket establishes the value of a domain name higher than its (usually fixed) registration cost. Domain names may also be sold through private sales. There are many situations where a person may desire to know the value of a domain name. As an example, the registrant of the domain name may desire to know the value of the domain name in order to value the domain name, the registrant's domain name portfolio or to know what price the domain name registrant should ask for or accept in selling the domain name. A potential buyer of the domain name may also want to know what is a fair price to offer or pay for the domain name. A domain name registrar may want to know a value of the domain name to better inform its customers of an estimated value for domain names under the management of the domain name registrar or other domain name registrars.

Referring to FIG. 1, the present invention enhances the accuracy of an estimated or predicted value 175 of a domain name by using a machine learning engine, such as an artificial neural network (ANN) 160, to predict the most likely sale price of a domain name. While the present invention will be described using an ANN 160, other types of machine learning language may be used in other embodiments to value target domain names.

Figure 2:
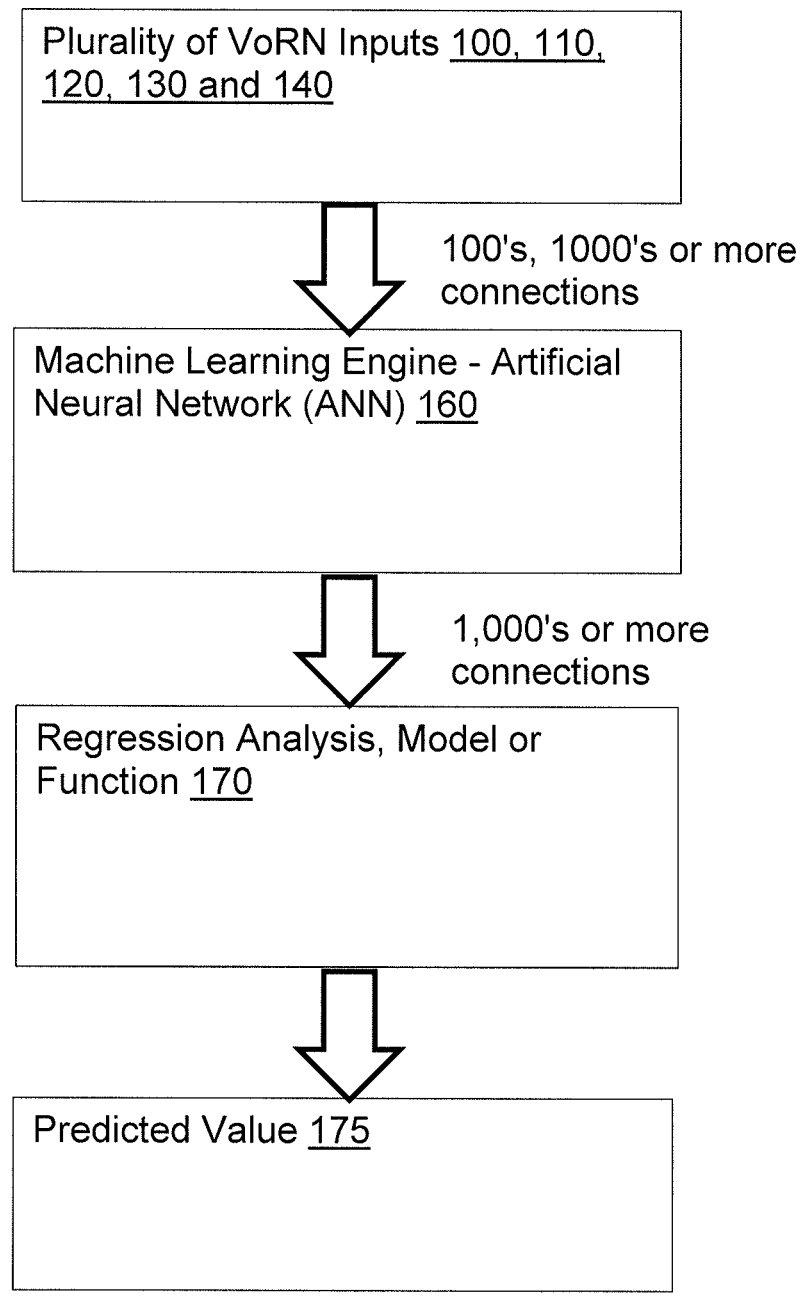
FIG. 2 is a diagram illustrating the general flow of information in practicing the present invention. Specifically, data from a training set for a sold domain name or data derived from a target domain name is communicated to a machine learning engine, such as an artificial neural network (ANN). The ANN communicates the information to a regression function. The regression function uses the information to predict a value of ether the previously sold domain name (during training) or the target domain name (during actual use).

The domain name valuation system (DNVS) 190 may associate different predicted sales prices for different domain name sales platforms. In other embodiments, the DNVS 190 may also determine a range for a predicted sale price and/or an uncertainty of the predicted one or more sales prices. FIG. 2, illustrates a possible flow of information for the present invention. While the DNVS 190 does not have to be a domain name registrar, in preferred embodiments, the DNVS 190 is also a domain name registrar.

Artificial Neural Networks (ANNs)

Figure 6:
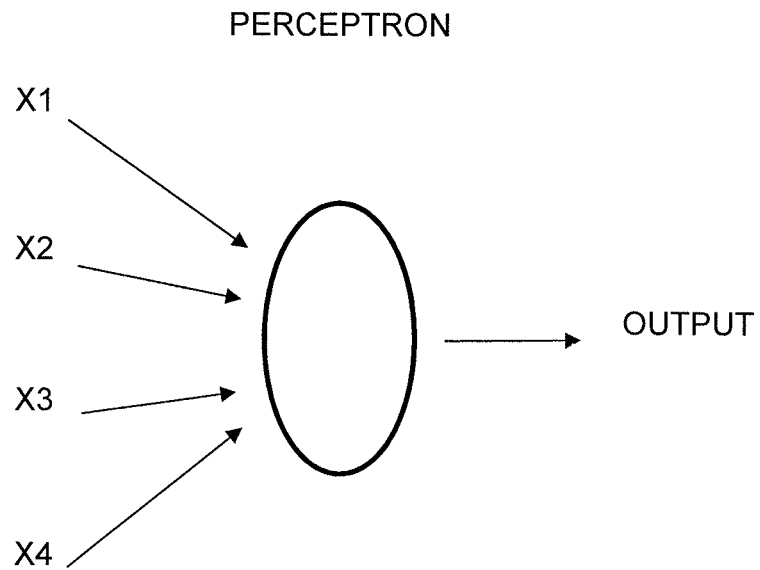
FIG. 6 is a diagram of a perceptron, one type of node or artificial neuron, that may be used to create an ANN, RNN and/or NN.
Figure 7:
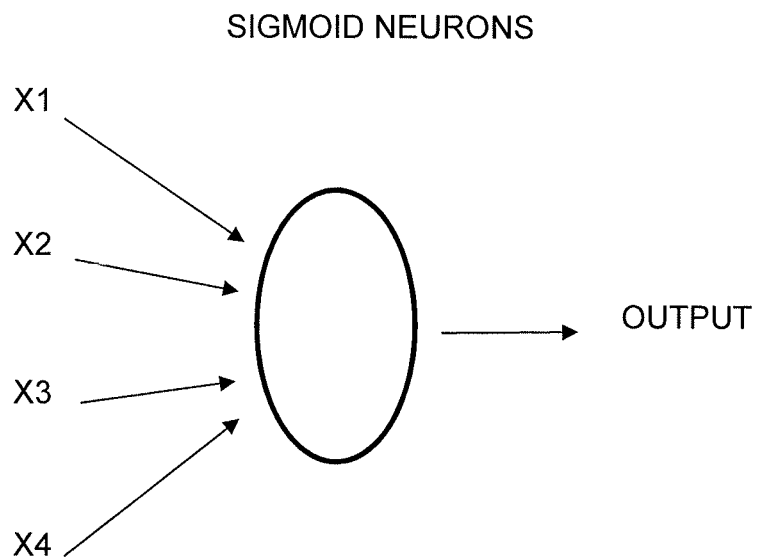
FIG. 7 is a diagram of a sigmoid neuron, another type of node or artificial neuron, that may be used to create an ANN, RNN and/or NN.

ANNs 160 may be loosely patterned after a biological brain and are useful in solving highly complex problems that have a large number of inputs. ANNs 160 comprise electrical circuits and/or software running on one or more computer hardware servers. ANNs 160 comprise a plurality of layers, with each layer comprising a plurality of nodes, i.e., artificial neurons, that may be of any known or later developed type of artificial neuron. As non-limiting examples, the nodes may be perceptrons (as illustrated in FIG. 6), sigmoid neurons (as illustrated in FIG. 7), Long Short Term Memory (LSTM) neurons and/or Gated Recurrent Units (GRU) neurons. Any combination of these types of nodes or artificial neurons may be used.

Figure 3:
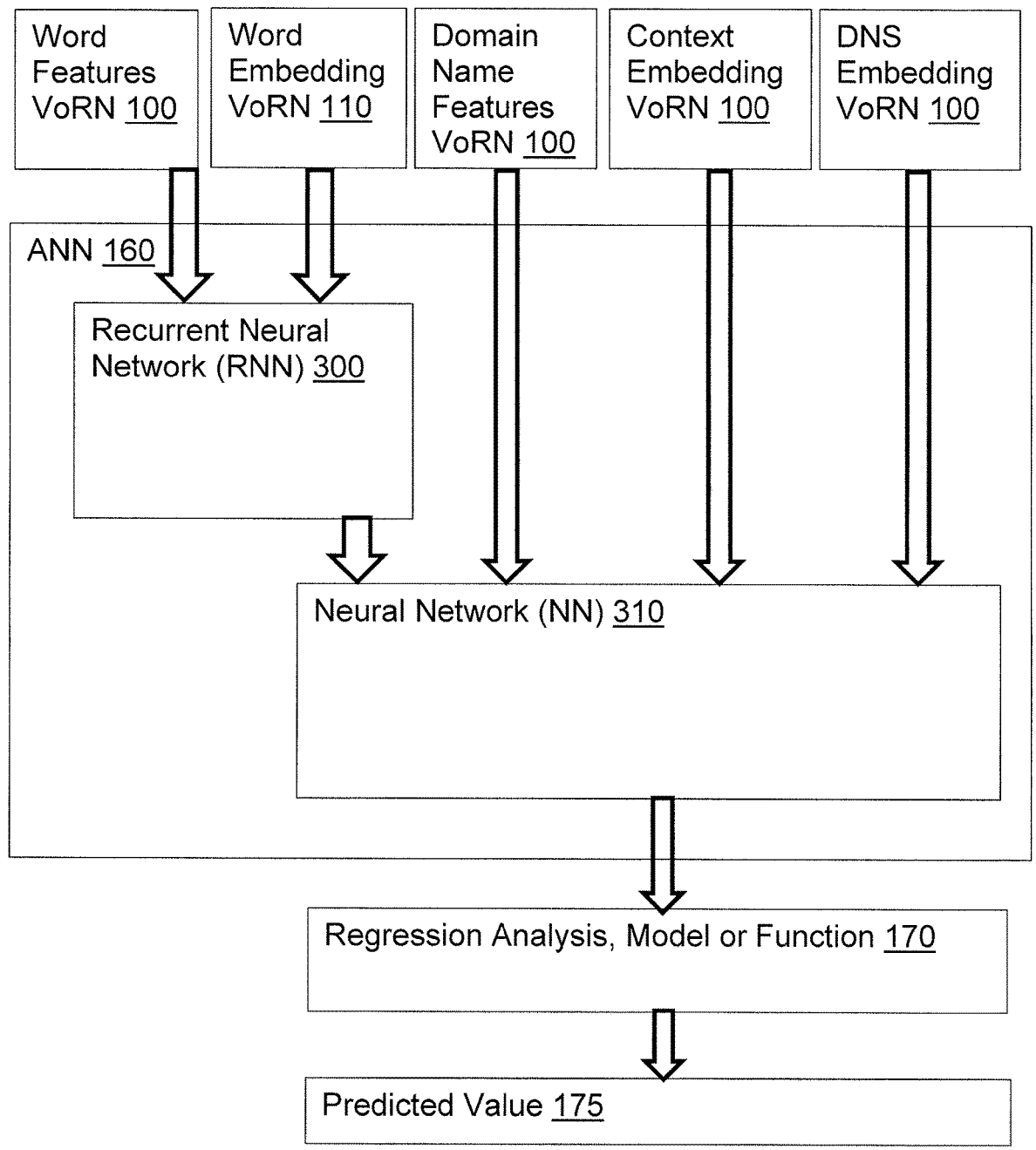
FIG. 3 is a diagram illustrating some of the possible inputs that may be fed into the ANN. Specifically, the diagram illustrates that one or more word features vector of real numbers and one or more word features vector of real numbers may be applied to a recurrent neural network (RNN) where the RNN feeds its inputs into a Neural Network (NN). A domain name feature vector of real numbers, a context embedding vector of real numbers and a DNS embedding vector of real number may also be applied to the NN. The output of the ANN (and specifically the NN in this arrangement) is fed into a regression function which then predicts a value for either a sold domain name (during training) or a target domain name (during actual use).
Figure 4:
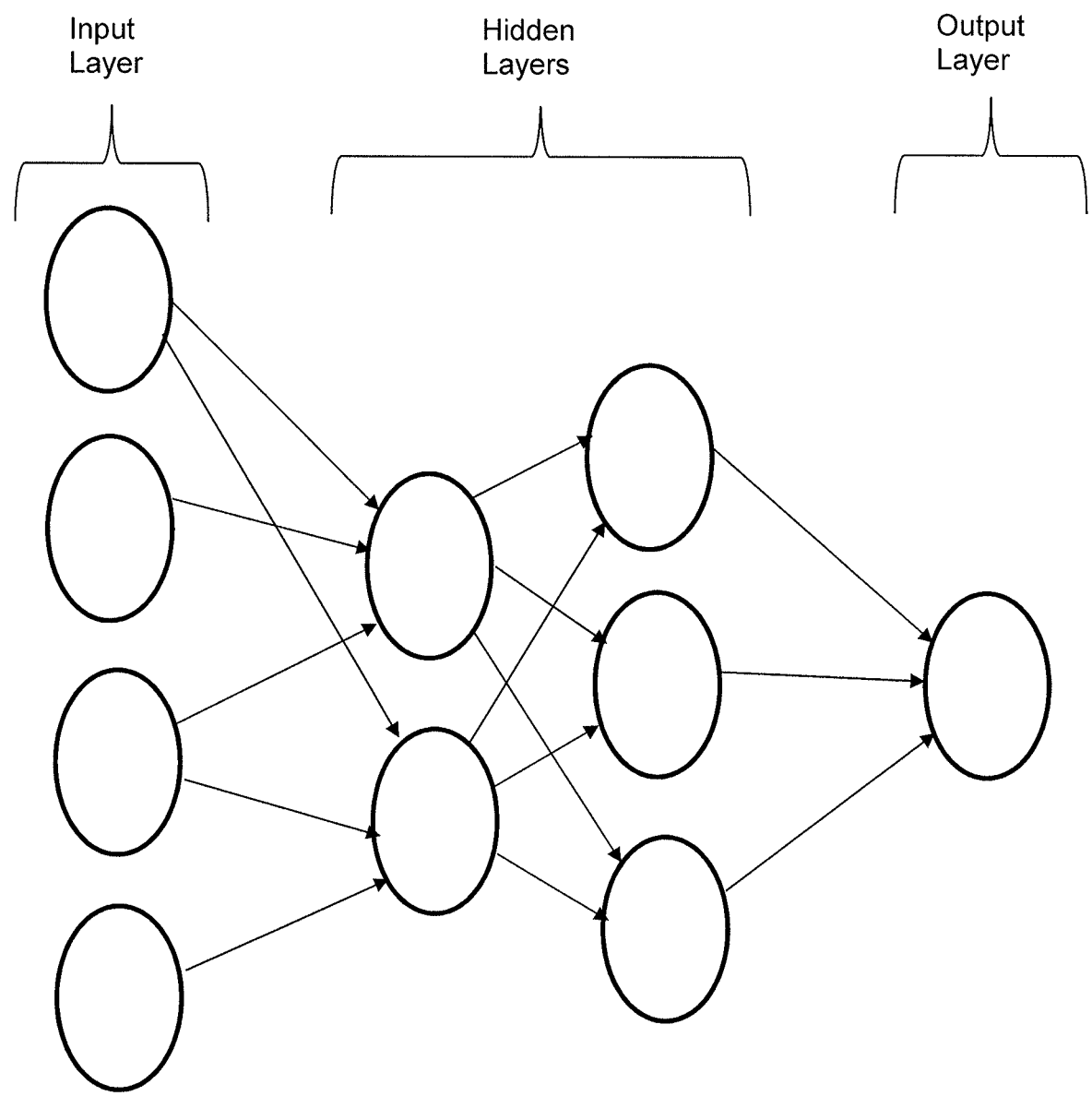
FIG. 4 is a diagram of a possible arrangement of nodes, i.e., artificial neurons, for an ANN, a RNN and/or a NN. The ANN, RNN and/or NN may comprise an input layer having one or more nodes, one or more hidden layers, with each hidden layer comprising one or more nodes and an output layer having one or more nodes. As illustrated, information is allowed to flow forward (left to right in the diagram), but is preferably prevented from flowing backwards through the nodes.

Regardless of the specific types of nodes used in the ANN, all nodes must run on electrical circuits and/or software running on one or more computer hardware servers. As illustrated in FIG. 4, ANNs 160 comprise an input layer having one or more inputs, one or more hidden layers with each hidden layer having one or more nodes (also referred to as artificial neurons) and an output layer having one or more outputs. As illustrated in FIG. 3, ANNs 160 themselves may comprise one or more neural networks (NN) and/or one or more recurrent neural networks (RNN 300). ANNs 160 that comprise at least one NN and at least one RNN 300 are referred to as hybrid ANNs.

Figure 5:
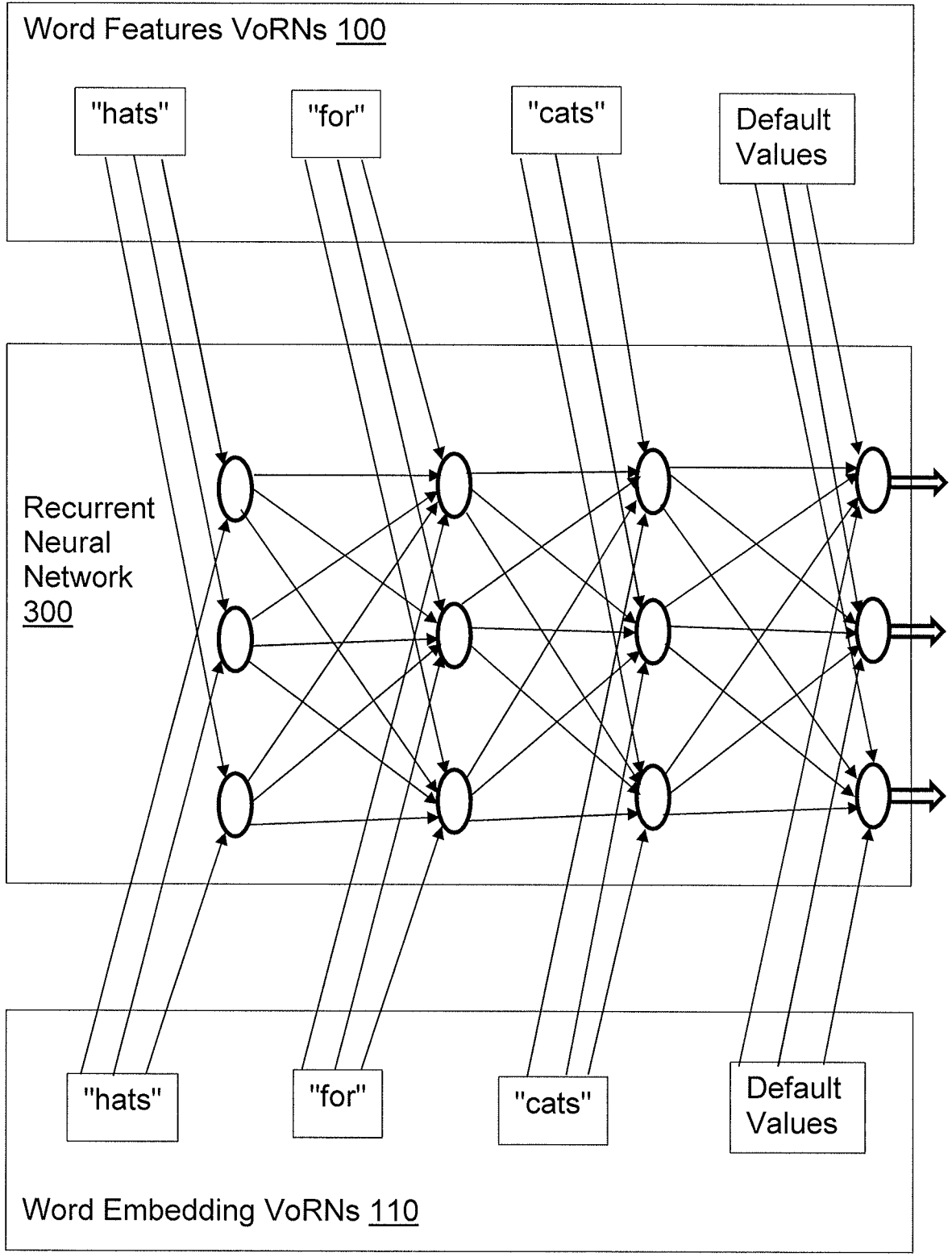
FIG. 5 is a diagram of a RNN that illustrates how different word features vectors of real numbers and different word embedding vectors of real numbers are applied directly to different hidden layers in the RNN and how the word features vectors of real numbers and word embedding vectors of real numbers are applied to the hidden layers in the RNN in the same order that the words appear in the sold domain names (during training) or in the target domain name (during actual use).

Each input in the input layer may forward a single output or number to one or more nodes in the first hidden layer. As illustrated in FIG. 5, inputs to the RNN 300 may be applied directly to any of the hidden layers, thereby skipping over earlier hidden layers. Each node may apply a different weight to each of its inputs (initially the weight is a random real number, but the weight may be adjusted during the training process). The output of each node may be based on a summation of the weighted inputs and a bias for the node. This calculation may be referred to as the activation function and it converts a node's weighted inputs and bias to an output of the node. Depending on the type of node, i.e., artificial neuron being used, the outputs are typically between −1 and 1, inclusive, 0 and 1, inclusive or greater than or equal to 0. The output for each node may be an input to one or more nodes in the next or later layer as specifically shown in FIGS. 4 and 5. Outputs are generally not allowed to be connected to an input of the same layer or earlier layers as ANNs 160 typically require a feed forward of information.

Each layer in the hidden layers may have one or more nodes that receive inputs from a previous hidden layer and apply their outputs to a subsequent layer. The last layer in the hidden layers may be connected to the inputs to the one or more nodes of the output layer.

In preferred embodiments, a regression function, analysis or model (herein referred to as a regression function 170) may be applied to the one or more outputs of the output layer to receive a final predicted answer, which for this invention may be an estimated or predicted sale price of a target domain name.

Creating a Training Set

Figure 8:
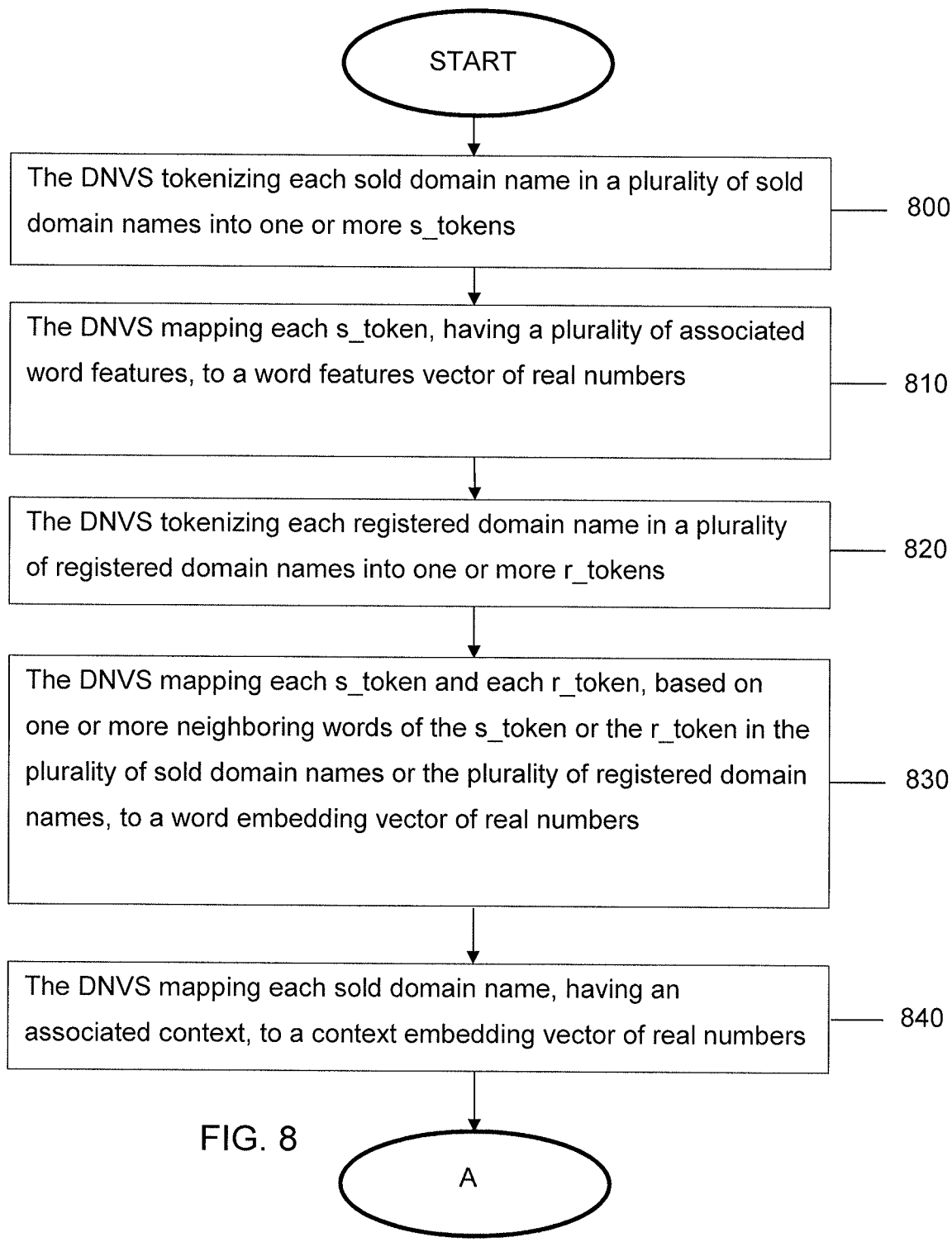
FIGS. 8 and 9 are flowcharts illustrating a process of creating a training set that may be used to train an ANN to value target domain names.
Figure 9:
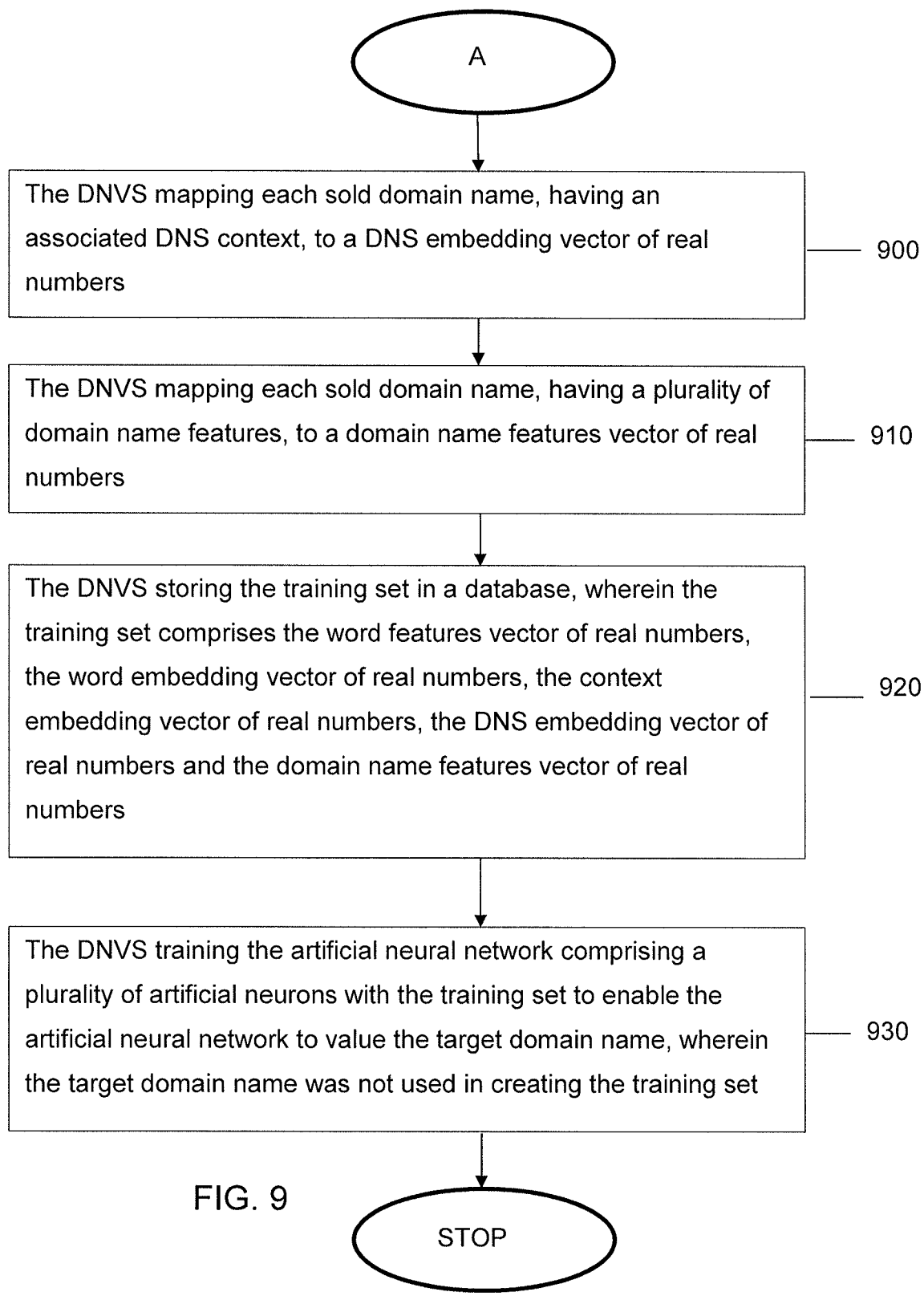

In a method of the invention illustrated in FIGS. 8 and 9, a training set 110 is created from historical data of past sold domain names 180, one or more zone files 182, one or more name server files 184, websites, other online information, proprietary information and/or information derived from one or more of these sources. The training set 110 may be used to allow the DNVS 190 to predict or estimate a value of one or more target domain names that are not part of the sold domain names 180.

The training set 110 preferably includes a large amount of data that may be used to not only train the ANN 160, but may also be used to evaluate or test the accuracy and reliability of the ANN 160 after the ANN 160 has been trained. Selecting the appropriate variables, converting the variables to real numbers (either by encoding or embedding) in the most effective manner and applying the variables to the ANN 160 greatly contributes to the success or failure of the ANN 160 in predicting values or future sales prices of domain names.

Some entities that have sold, assisted customers, and/or have auctioned large numbers of domain names may have one or more databases of historical sales data for the sold domain names 180. These databases may be used by an ANN 160 as training data to build a model to determine a predicted sales value for any given domain name, even if the domain name has never been sold before.

The databases comprise data stored on electrical and/or mechanical device operating in combination with one or more hardware server. The invention may use one or more virtual databases running on one or more virtual servers in the cloud, but the software, virtual databases and virtual servers run on actual physical computer hardware. The database storing the training set 110 may be a central or a distributed database or any other type of desired physical database.

A method for a DNVS 190 to create a training set 110 used by an ANN 160 to value a target domain name will now be discussed. The DNVS 190 may access one or more databases having data regarding historical sales for a large number of sold domain names 180. The DNVS 190 may tokenize each sold domain name into one or more s_tokens.

Any desired method of tokenizing each sold domain name into one or more s_tokens may be used. (Step 800) As a nonlimiting example, the DNVS 190 may parse each sold domain name, from left to right, character by character and compare the parsed characters to one or more electronic dictionaries looking for words. For the purposes of the specification, each s_token may comprise a word, place, name, abbreviation, phrase, number, dash and/or a string of characters (last resort if the word does not fit any other category).

In preferred embodiments, many different language dictionaries (preferably at least the languages most commonly used on the Internet), location dictionaries, name dictionaries, abbreviation dictionaries and/or phrase dictionaries may be used in identifying words. The parsing process may be repeated until one or more s_tokens are found for each sold domain name. In some cases, a sold domain name might comprise a string of characters that do not match any entries in any dictionary. In such a case, that string of unrecognized characters may still be considered a s_token.

In some cases, a sold domain name may be able to be broken up into two or more sets of s_tokens. As an example, if the domain name is "carrot.com," the domain name may be broken into a first set of s_tokens "car" and "rot" and a second set of the s_tokens "carrot." In this situation, the DNVS 190 may examine a title, a tag and/or a text of a website accessed by the domain name "carrot.com" and determine how frequently the words "car" and "rot" appear (and perhaps how frequently they appear in close proximity) and how frequently the word "carrot" appears. In another embodiment, all sets of s_tokens may be valued by a single model and the set of s_tokens that produces the highest value is selected on the basis that the bidder for the highest value will outbid the other bidders of lower values.

The DNVS 190 may select the set of s_tokens that appear more frequently in the title, tag and/or text of the website or that appear together approximately the same number of times, but not zero times. Thus, if the words "car" and "rot" never appear in the title, tag and/or text, but the word "carrot" appears 12 times in the title, tag and/or text of the body, the DNVS 190 may select the word "carrot" as the s_token for that sold domain name. On the other hand, if "car" is found 8 times and "rot" is found 5 times in the title, tag and/or text of the body, but the word "carrot" is never found in the title, tag and/or text of the body, the DNVS may select the words of "car" and "rot" as the s_tokens for that sold domain name.

Care should be taken as a domain name may be improperly broken down into one or more words that include an article of speech (or any other very commonly used word). In such a case the article of speech might be found many times in the title, tag and/or text of the website. To prevent this, increased weight may be given to sets of s_tokens that appear near each other and/or that appear approximately the same number of times as each other and/or that are not articles of speech (or frequently used words). For example, greater weight may be given to nouns or words that not used very often, but are nevertheless found in the title, tag and/or text of the website at a frequency much greater than expected based on how often the s_tokens appear in other bodies of text.

The DNVS 190 may limit the number of s_tokens to any desired number, but preferably uses at least the first and the last found s_token in each sold domain name. In some embodiments, the DNVS 190 may limit the number of s_tokens used for any sold domain name (or target domain name) to four or less s_tokens. As an example, the DNVS 190 may use the first three s_tokens found and the last s_token, for a total of four s_tokens. As computing power increases in the future, it may be desirable to use more than up to four s_tokens, such as up to five or up to six s_tokens for each sold domain name.

The DNVS 190 may determine a plurality of word features for each s_token found in the sold domain names 180. (Step 810) The word features selected to be determined are preferably those that have the greatest effect on the value of a domain name 175. In addition, the more word features selected, the better the ANN 160 will be able to value a target domain name.

As non-limiting examples, the word features may be: Is the s_token in an English dictionary? Is the s_token in a French Dictionary?; How many times does the s_token appear in a given body of text (such as all sold domain names 180 or all registered domain names)?; Is the s_token an article of speech? Is the s_token found in a dictionary of female names? Is the s_token found in a dictionary of male names? Is the s_token in a dictionary of acronyms? How many letters are in the s_token?

It should be kept in mind that word features are related to the one or more s_tokens found in the sold domain name (or later, the target domain name) and not to the entire sold domain name (or target domain name). It should also be understood that looking for a word in a particular dictionary (say an English dictionary) is exactly the same as looking for the word in a comprehensive dictionary that identifies the word as an English word.

Questions that have a "yes" or a "no" answer may be given a Boolean or binary value, such as, as a non-limiting example, a "1" for "yes" and a "0" for "no." Questions that have a numerical answer may be given the numerical answer or may be scaled to be between −1 and 1, inclusive or between 0 and 1, inclusive. Any number of word features may be used. Increasing the number of word features may improve the accuracy of the ANN 160, but require greater computational power. In preferred embodiments, at least 40 different word features are determined for each s_token and are stored in the database as part of the training set. It is foreseeable in the future, as computing power continues to increase, that it will be desirable to determine more than 40 word features, i.e., dimensions, for each s_token.

Each s_token may be mapped to a word features vector of real numbers 100. A word features vector using metadata (and not real numbers) may be represented as (Is the s_token in an English dictionary?; How often is the s_token found in all sold domain names 180?; Is the s_token found in a female name dictionary?; How many characters are in the s_token?) This is an example of a word features vector of metadata having four word features, i.e., four dimension.

Using "carrot" as an example s_token, it may be that "carrot" is found in an English dictionary, "carrot" may be found 849 times in all sold domain names 180, "carrot" may not be found in a female name dictionary and "carrot" has 6 characters. In this example, the s_token of "carrot" may be mapped to a word features vector of real numbers 100 of (1; 849; 0; 6) having four dimensions.

This process may be repeated for every s_token and a word features vector of real numbers 100 may be created for every s_token and stored in a database as part of the training set 110. In a preferred embodiment, each word features vector or real numbers 100 comprises at least 40 different word features (and thus 40 dimensions) and not just the illustrated four word features in the above example.

The DNVS 190 may tokenize each registered domain name in a plurality of registered domain names into one or more r_tokens. (Step 820) The same methods used to tokenize the plurality of sold domain names 180 may be used to tokenize the plurality of registered domain names. The plurality of registered domain names may be read from any desired database. As a non-limiting example, the registered domain names may be read from one or more zone files 182 stored in the database or databases of registered domain names.

In creating the training set 110 and using the ANN 160, several of the described steps may use a process known as word embedding. Word embedding is the collective name for a set of language modeling and feature learning techniques in natural language processing where words or phrases from the vocabulary are mapped to vectors of real numbers in a low dimensional space relative to the vocabulary size.

The vectors of real numbers (VoRN) for the word embedding may comprise any desired number of values, i.e., dimensions. As non-limiting examples, the word embedding vector of real numbers 110 may comprise 50 values or dimensions for each s_token, the context embedding vector of real numbers 120 may have 4 values or dimension per domain name, the DNS embedding vector of real numbers 130 may have 64 values or dimension and the domain name features vector of real numbers 130 may have 91 values or dimensions.

As part of the process of creating these word embeddings, the process may start by assigning a random number, such as between 0 and 1, inclusive, to every value or dimension. Any desired process of word embedding may be used to create any of the vectors of real numbers and the logistic regression parameters of the regression or regression function. As non-limiting examples, methods to generate the mappings or word embeddings may include hill climbing (gradient descent), using neural networks, dimensionality reduction on the word co-occurrence matrix, probabilistic models and explicit representation in terms of the context in which words appear.

The DNVS 190 may map each s_token and each r_token to a word embedding vector of real numbers 110. (Step 830) It may be possible to only consider r_tokens and not s_tokens as every s_token also comes from a registered domain name. Only currently registered domain names may be considered or any domain name that has every been registered (or registered during some selected time period) may be considered. The word embedding vector of real numbers 110 places similar words closer together in high dimensional space than dissimilar words.

As an example, the word "man" may be mapped in high dimensional space closer to the words "woman" and "king," but farther away from the word "queen." The words "walk," "walked" and "walking" may be mapped closer together, i.e., in a cluster, but further away from the words "swim," "swimming" and "swam," which may be mapped in their own cluster. Countries and capitals may be mapped close together, such as the words "Buenos Aires" and "Argentina." Words in a particular language will generally be mapped closer together than words of different languages. Synonyms are preferably mapped very close to each other, antonyms may be mapped further away than synonyms while totally unrelated words will be mapped even further apart.

The DNVS 190 may use any number of values or dimensions for the word embedding vector of real numbers 110. The more values or dimensions used, the more accurate the word embedding vector of real numbers 110, but creating the word embedding vector of real numbers 110 is more computationally expensive. The fewer values or dimensions used, the less accurate the word embedding vector or real numbers, but creating the word embedding vector of real numbers 110 is less computationally expensive.

As a non-limiting example, the DNVS 190 may use 40 dimensions in each of the plurality of word embedding vector or real numbers. Thus, the word "carrot" might have a word embedding vector of real numbers 110 of [0.5, 0.1, 0.9, 0.2, 0.4, 0.4, 0.3, 0.2, 0.7, 0.1, 0.2, 0, 1, 0.6, 0.6, 0.8, 0.1, 0.8, 0.2, 0.1, 0.8, 0.7, 0.4, 0.3, 0.6, 0.9, 0.9, 0.1, 0.2, 0.1, 0.6, 0.5, 0.3, 0.5, 0.4, 0.2, 0.6, 0.9, 0.7, 0.7]. This word embedding vector of real numbers 110 maps the word "carrot" to a specified point in high dimensional space. While each dimension may be assigned any number, each of the 40 dimensions are preferably assigned a value between −1 and 1, inclusive or between 0 and 1, inclusive. The range of values may be selected depending on the types of nodes or artificial neurons used by the ANN 160. This allows each dimension to be easily applied to the inputs of the nodes of the ANN 160 without additional weighting or scaling of the values. While a single decimal digit is displayed for each value in the above example to keep the example simple, additional digits may be used to increase the accuracy of each value for each dimension and thus of the ANN overall.

The DNVS 190 may use any desired method of mapping each s_token and each r_tokens to a word embedding vector of real numbers 110. As a non-limiting method, the DNVS 190 may take advantage of the fact that similar words tend to have similar neighboring words. Thus, the DNVS 190 may map similar s_tokens and similar r_tokens, based on neighboring words of the s_token or the r_token, closer together in high dimensional space, than dissimilar s_tokens and r_tokens. While determining neighboring words may use any sufficiently large body of words or text, in a preferred embodiment, the method uses only neighboring words in sold domain names 180 and/or words in registered domain names and does not using neighboring words in any other bodies of text. This customizes the word embedding vectors of real numbers to be domain name specific as desired domain names have a different format and desired word combinations than in any other body of text. In other words, the format of desired domain names is unique. Determining neighboring words using only sold and/or registered domain names in the word embedding process has the advantage of greatly improving the ability of the ANN 160 to estimate or predict a value of a target domain name.

As an example process, a random number, preferably between −1 and 1, inclusive or between 0 and 1, inclusive, may be assigned to every value or dimension in every word embedding vector of real numbers 110 for every s_token and every r_token. A logistic regression model may then be trained to predict neighboring words in the sold domain names 180 and/or the registered domain names. While other bodies of text may be used, as described above, the preferred method only looks at neighboring words in sold domain names 180 and/or registered domain names to keep every word embedding vector or real numbers specific to domain names.

As an example, the domain name hatsforcats.com may be tokenized, using previously described methods, into the words "hats," "for" and "cats." The model must then predict "for" given "hats," predict "hats" and "cats" given "for" and predict "for" given "cats." The technique of gradient descent, also known as hill climbing, may be used to simultaneously create the word embedding vectors of real numbers and the logistic regression parameters. Many iterations of the process may have to be performed to create a useful word embedding vectors of real numbers for the plurality of s_tokens and r_tokens. The process may be speeded up by using the technique of random sampling, also known as noise-contrastive estimation (NCE) loss.

Each sold domain name may have an associated context. The associated context refers to where and when the domain name was last sold or one or more prior sales of the sold domain name. As examples, a domain name may have been sold at Afternic Reseller in the year 2016 or at GoDaddy Auctions in the year 2010. In these examples, the associated context may be defined as "Afternic Reseller 2016" or "GoDaddy Auctions 2010" respectively. Using the previously described method of embedding s_tokens and/or r_tokens, the DNVS 190 may map each sold domain name, based on the associated context for each sold domain names 180, to a context embedding vector of real numbers 120. (Step 840) In a preferred embodiment, there are four or more values or dimensions in each context embedding vector of real numbers 120.

In some embodiments, an associated DNS context for each sold domain name may be mapped to a DNS embedding vector of real numbers 130. (Step 900) The DNS is a hierarchical decentralized naming system for computers, services, or any other resource connected to the Internet or a private network. The DNS associates various information with domain names registered to various domain name registrants. The DNS is primarily known for translating more readily memorized domain names to IP addresses.

The DNS context refers to data or information about the domain name system (DNS) used by the sold domain name. As examples, the associated DNS context may include information regarding the Internet Service Provider (ISP) used by the sold domain name, nameservers for the sold domain name and/or nameservers for domain names with the same second level domain (SLD) as the sold domain name, but with different top-level domains (TLDs). The DNS embedding vector of real numbers 130 may be created using categorical variables, i.e., "Does the DNS resolve to a Go Daddy nameserver?" for each value or dimension in DNS embedding vector of real numbers 130. Alternatively, the DNVS 190 may embed the DNS context information as explained for the s_tokens and/or r_tokens (mapping in high dimensional space similar words more closely together than dissimilar words) in creating the plurality of word embedding vector of real numbers 110.

The DNVS 190 may map each sold domain name, having a plurality of domain name features, to a domain name features vector of real numbers 130. (Step 910) The plurality of domain name features may comprise, as non-limiting examples, one or more categorical variables and/or one or more numerical variables. As examples, a value or dimension in the domain name features vector of real numbers 130 may be a number of words found in the sold domain name, Wikipedia® traffic data for the SLD of the sold domain name, Google® books ngram data, "Is the TLD .com?", "Is the TLD .net?", "Is the SLD a phrase?", number of characters in the domain name, number of dashes in the domain name, number of consonants in the domain name, number of numbers in the domain name, number of misspelled words in the domain name, etc. Any number of domain name features may be used, but in a preferred embodiment the domain name features vector of real numbers 130 may have 90 or more values or dimensions (domain name features).

Thus, as a preferred result of the above process, 1) the word features vector of real numbers 100 maps similar s_tokens closer to each other than to dissimilar s_tokens in high dimensional space; 2) the word embedding vector of real numbers 110 maps similar s_tokens and r_tokens closer to each other than to dissimilar s_tokens and r_tokens in high dimensional space; 3) the context embedding vector of real numbers 120 maps similar sold domain names 180, having an associated context, closer to each other than to dissimilar sold domain names 180, having an associated context, in high dimensional space; 4) the DNS embedding vector of real numbers 130 maps sold domain names 180, having an associated DNS context, closer to each other than to dissimilar sold domain names 180, having an associated DNS context, in high dimensional space and/or 5) the domain name features vector of real numbers 130 maps similar sold domain names 180, having a plurality of domain name features, closer to each other than to dissimilar sold domain names 180, having a plurality of domain name features, in high dimensional space.

The training set 110, comprising the word features vector of real numbers 100, the word embedding vector of real numbers 110, the context embedding vector of real numbers 120, the DNS embedding vector of real numbers 130, the domain name features vector of real numbers 130 and/or some combination thereof may be stored in the database. (Step 920) The training set 110 created in this manner may be used to train an ANN 160 to value one or more target domain names. (Step 930)

It should be appreciated that the ANN 160 to be trained may comprise one or more recurrent neural networks (RNNs) and/or one or more Neural Networks (NNs). The RNN and NN are themselves comprised of multiple layers, with each layer comprising a plurality of nodes, i.e., artificial neurons. The artificial neurons may comprise electronic circuitry or the artificial neurons may be simulated using software running on one or more computer hardware servers.

In a preferred embodiment, the ANN 160 may comprise a RNN that receives as inputs the word features vectors of real numbers and the word embedding vector of real numbers 110. The outputs (as a non-limiting example) of the RNN, which may comprise 200 or more outputs, the context embedding vector of real numbers 120, the DNS embedding vector of real numbers 130 and the domain name features vector of real numbers 130 may be used as inputs into a NN. The NN may have, as a non-limiting example, 1,000's of outputs that may be used as inputs into a regression function 170 that may be used to determine the final estimated or predicted value of a sold domain name (during training) or a predicted value of a target domain name (during actual use).

Training the ANN

Figure 10:
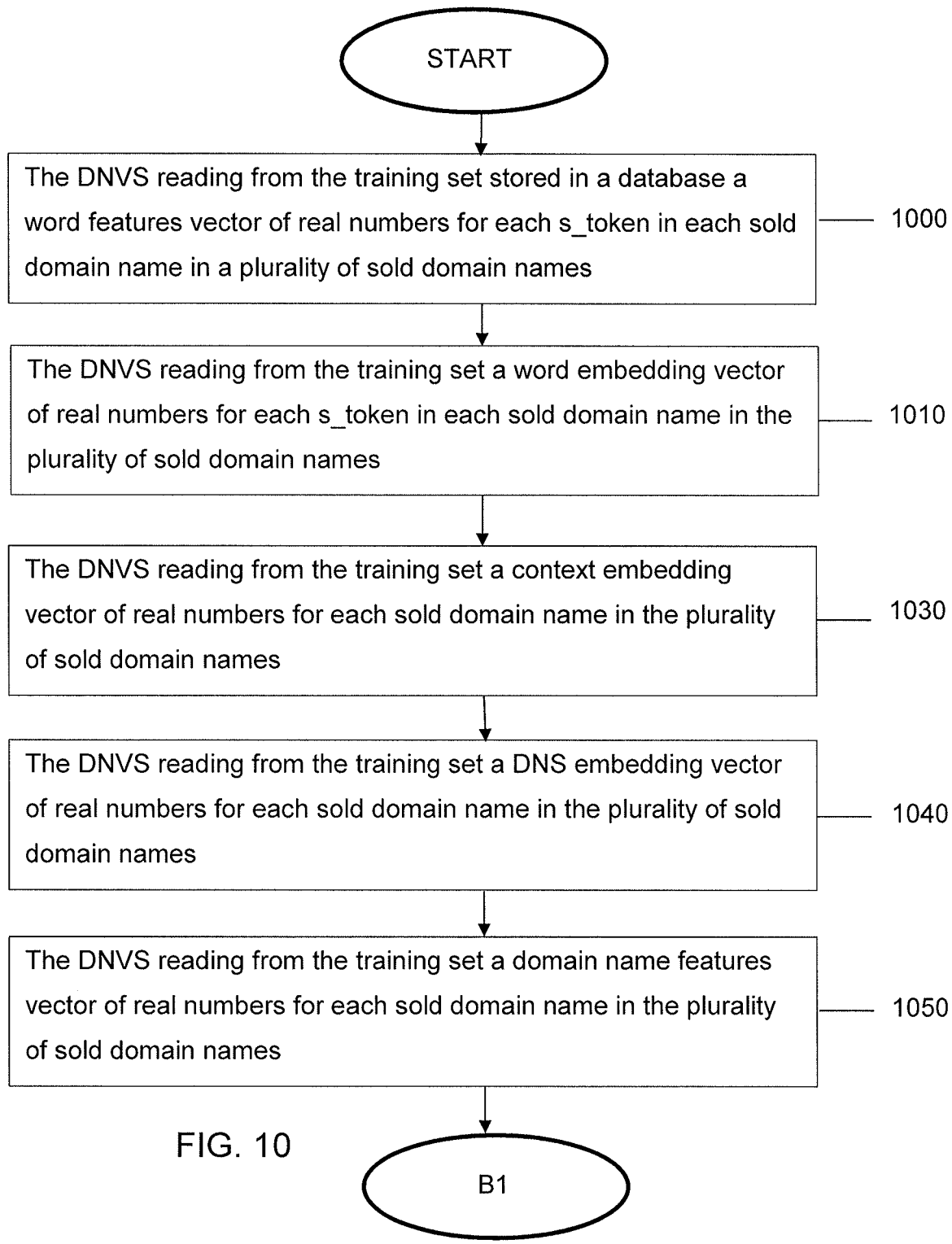
FIGS. 10-12 are flowcharts illustrating a process of training an ANN using the training set.
Figure 11:
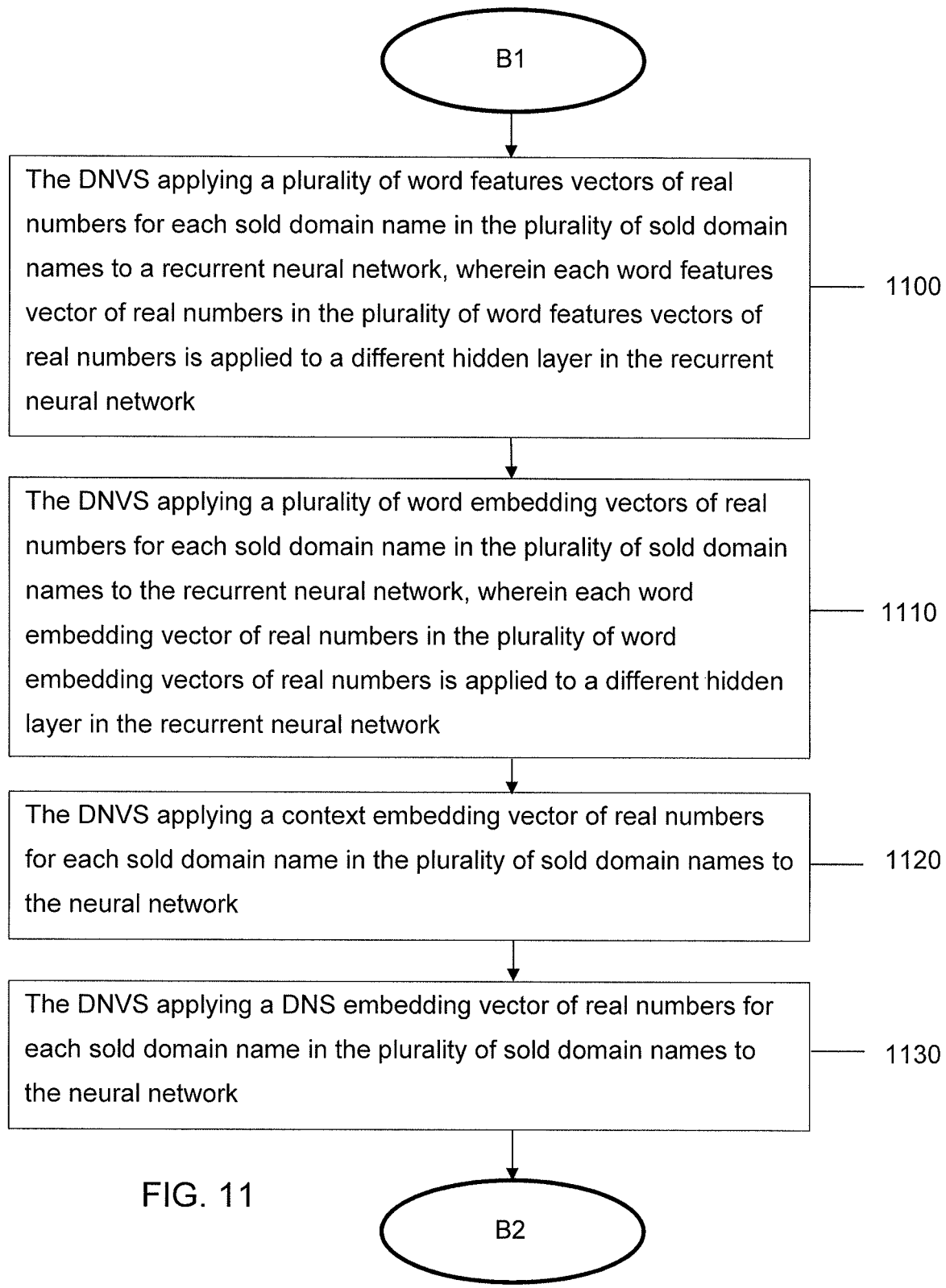
Figure 12:
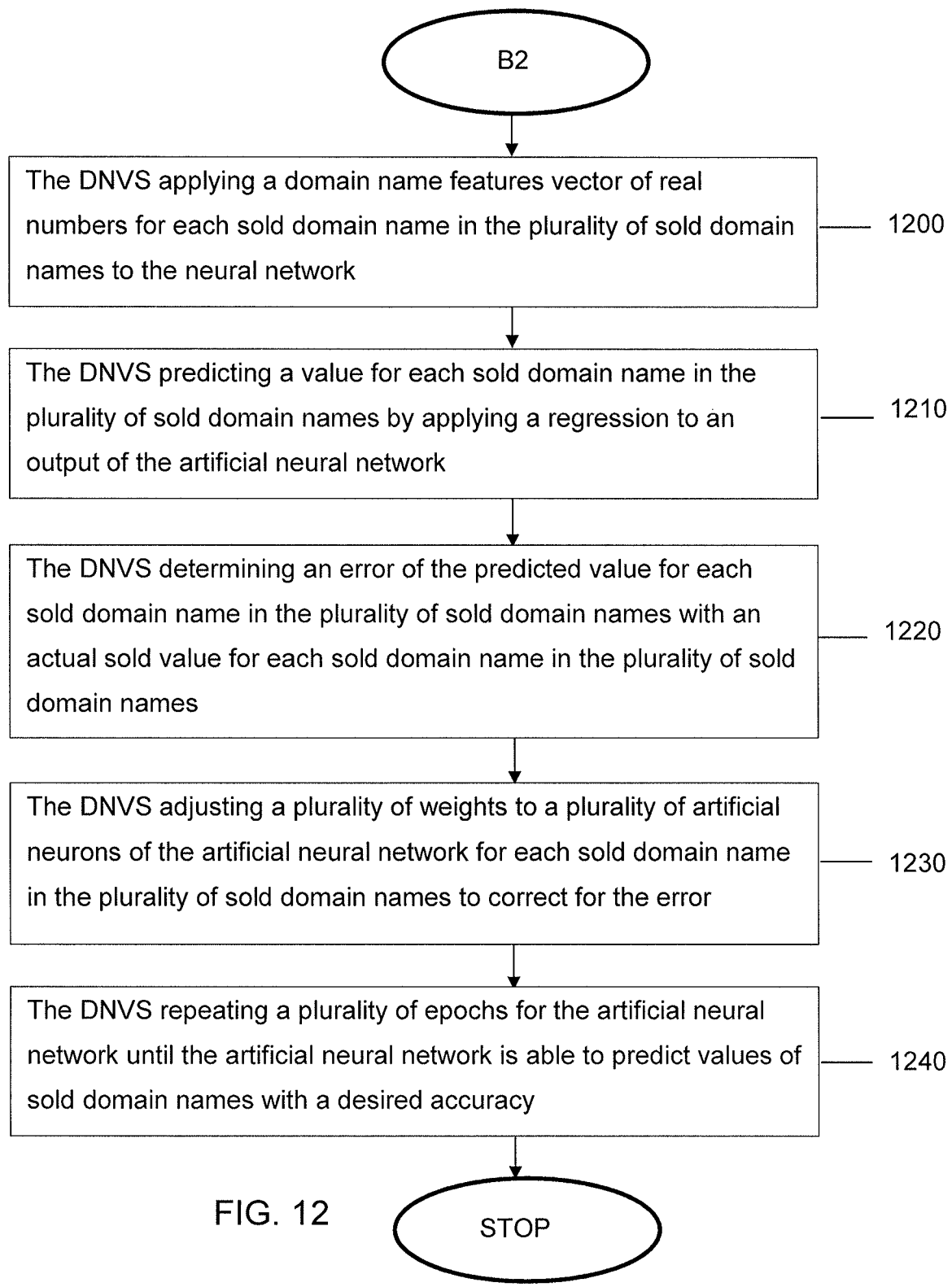

With reference to FIGS. 10-12, methods for the DNVS 190 to train the ANN 160 preferably use a training set 110 created using the above described method. Training the ANN 160 enables the ANN 160 to value or predict a future sale price of a target domain name (even if the target domain name was not used in creating the training set 110). At the start of training the ANN 160, a different random weight may be assigned to each input for every node in every layer. A random bias may also be assigned to every node. A learning rate may also be selected using a heuristic approach or by trial and error as part of the training process. The training process may also use gradient descent (hill climbing) and/or a backpropagation algorithm to train the ANN 160 as each sold domain name is processed one at a time.

The training set 110 may be used to train one or more ANNs 160 any number of different times. In addition, ANNs 160 may be trained using some part of the training set 110 and then the ANN 160 may be tested using the remainder of the training set 110 to test how well the ANN 160 was trained.

As an example, an ANN 160 may be trained to predict or estimate a sale price of a target domain name using some percentage (such as 80%) of sold domain names 180 and then the ANN 160 may be tested using the remaining percentage (such as 20%) of the sold domain names 180. The estimated or predicted sales prices from the ANN 160 may be compared with the actual sales prices of the sold domain names 180. The ANN 160 may be further trained (additional epochs using the training set 110) if a desired accuracy has not been reached. Once the ANN 160 has been trained and tested using the created training set 110, future target domain names may be submitted and a predicted value may be determined for the target domain name, even if the target domain name was not part of the training set 110.

The DNVS 190 may read from the training set 110 stored in the database a word features vector of real numbers 100 for each s_token in each sold domain name in a plurality of sold domain names 180. (Step 1000) The word features vector of real numbers 100 may be created as described above as part of the process of creating the training set 110. While the training set 110 comprises a plurality of word features vector of real numbers 100 (one for every different word from every sold domain name), the DNVS 190 does not have to read all of them at the same time as the DNVS 190 applies the word vector of real numbers one or a few at a time to inputs of the ANN 160. While each word features vector of real numbers 100 may comprise any desired number of dimensions, in a preferred embodiment each word feature vector of real numbers has 40 dimensions, constituting 40 inputs into the ANN 160 per applied word feature vector of real numbers.

The DNVS 190 may also read from the training set 110 a word embedding vector of real numbers 110 for each s_token in each sold domain name in the plurality of sold domain names 180. (Step 1010) The word embedding vector of real numbers 110 may also be created as described above as part of the process of creating the training set 110. Also, while the training set 110 comprises a plurality of word embedding vector or real numbers (one for every different word from every sold domain name and/or registered domain name), the DNVS 190 does not have to read all of them at the same time as the DNVS 190 applies the word embedding vector of real numbers 110 one or a few at a time to inputs of the ANN 160. While each word embedding vector of real numbers 110 may comprise any desired number of values or dimensions, in a preferred embodiment each word feature vector of real numbers has 50 values or dimensions, constituting 50 inputs into the ANN 160 per applied word feature vector of real numbers.

The DNVS 190 may also read from the training set 110 a context embedding vector of real numbers 120 for each sold domain name in the plurality of sold domain names 180. (Step 1020) The context embedding vector of real numbers 120 may also be created as described above as part of the process of creating the training set 110. While the training set 110 comprises a plurality of context embedding vector of real numbers 120 (one for every sold domain name in the plurality of sold domain names 180), the DNVS 190 may read them one or more at a time as the DNVS 190 applies the context embedding vector of real numbers 120 one at a time to the inputs of the ANN 160. While each context embedding vector of real numbers 120 may comprise any desired number of values or dimensions, in a preferred embodiment each context embedding vector of real numbers 120 has four values or dimensions, constituting four inputs into the ANN 160.

The DNVS 190 may also read from the training set 110 a DNS embedding vector of real numbers 130 for each sold domain name in the plurality of sold domain names 180. (Step 1030) The DNS embedding vector of real numbers 130 may also be created as described above as part of the process of creating the training set 110. While the training set 110 comprises a plurality of DNS embedding vector of real numbers 130 (one for every sold domain name in the plurality of sold domain names 180), the DNVS 190 may read them one or more at a time as the DNVS 190 applies the DNS embedding vector of real numbers 130 one at a time to the inputs of the ANN 160. While each DNS embedding vector of real numbers 130 may comprise any desired number of values or dimensions, in a preferred embodiment each DNS embedding vector of real numbers 130 has 64 values or dimensions, constituting 64 inputs into the ANN 160.

The DNVS 190 may also read from the training set 110 a domain name features vector of real numbers 130 for each sold domain name in the plurality of sold domain names 180. (Step 1040) The domain name features vector of real numbers 130 may also be created as described above as part of the process of creating the training set 110. While the training set 110 comprises a plurality of domain name feature vector of real numbers (one for every sold domain name in the plurality of sold domain names 180), the DNVS 190 may read them one or more at a time as the DNVS 190 applies the domain name features vector of real numbers 130 one at a time to the inputs of the ANN 160. While each domain name features vector of real numbers 130 may comprise any desired number of values or dimensions, in a preferred embodiment each domain name features vector of real numbers 130 has 91 values or dimensions, constituting 91 inputs into the ANN 160.

As part of the training method, the DNVS 190 selects, preferably through a random process, a batch or sample of sold domain names from the plurality of sold domain names 180 every epoch to use to train the ANN 160. It should be understood that the DNVS 190 selects a different batch or sample of sold domain names from the plurality of sold domain names 180 every epoch. As part of the training method, the DNVS 190 processes one sold domain name at a time in the batch or sample of sold domain names until all of the sold domain names in the batch or sample have been processed. This process may need to be repeated many times to train the ANN 160. In a preferred embodiment, the batch or sample of sold domain names are only taken from a certain percentage of sold domain names 180. This allows the sold domain names in the plurality of sold domain names 180 that are not used during training to be used during the testing of the DNVS 190. As an option, the training process may also include a plurality of domain names having random characters and/or nonsensical word combinations. As these domain names comprise random characters and/or nonsensical word combinations, they should have a minimal expected or predicted sales prices. Thus, these domain names may be assumed to have a sales price at, below or near the bottom of all of the sold domain names 180 and assigned a default value reflecting this very low value.

As a specific example, the assigned sales price for a randomly generated domain name of "wu2e-ru23-er6uei.com" might be the current registration fee (or lower) for registering any available domain name at a selected domain name registrar. A value for the random domain names below the current registration cost of registering a domain name may be justified as the randomly generated domain name could be registered by anybody for the current registration cost, but is not being registered, implying the randomly generated domain name is worth less than the current cost of registering the domain names.

As each sold domain name was previously tokenized during the process of creating the training set 110 (and preferably this information was saved in the database as part of the training set 110), the DNVS 190 is able to determine a number of s_tokens in each sold domain name. The DNVS 190 may set a maximum number of s_tokens it will consider in any sold domain name as part of the training process. In a preferred embodiment, the DNVS 190 may consider up to four different s_tokens in each sold domain name. While any number of different s_tokens may be used, the invention will be explained using a maximum of four s_tokens for any sold domain name in the plurality of sold domain names 180.

As an example, if the sold domain name (in a plurality of sold domain names 180) currently being trained on is "hatsforcats.com," the DNVS 190 may have already tokenized that domain name into the s_tokens of "hats," "for" and "cats" using previously described methods. The DNVS 190 may then read the word feature vectors of real numbers and the word embedding vector or real numbers for the s_tokens of "hats," "for" and "cats." If the DNVS 190 is using up to four different s_tokens, the DNVS 190 may select for the fourth s_token (which does not exist in the domain name "hatsforcats.com") a default s_token that may be mapped to a null group or a vector of real numbers of all 0's, all 0.5's, all 1's or a random vector of real numbers. The selected default value should be used consistently during training of the ANN 160 and during actual use of the ANN 160 in valuing target domain names.

The DNVS 190 may also read the context embedding vector of real numbers 120, the DNS embedding vector of real numbers 130 and the domain name features vector of real numbers 130 for the sold domain name of "hatsforcats.com."

The DNVS 190 may apply a plurality of word features vectors of real numbers for each sold domain name in the plurality of sold domain names 180 to a RNN 300. Each word features vector of real numbers 100 in the plurality of word features vectors of real numbers may be applied to a different hidden layer in the RNN 300 as illustrated in FIG. 5.

The sequence of s_tokens are preferably applied to the hidden layers in the same order the sequence of words appear in the sold domain name. Thus, for our example of "hatsforcats.com," the word feature vector of real numbers for "hats" may be applied to a first hidden layer, the word feature vector of real numbers for "for" may be applied to a second hidden layer, the word feature vector of real numbers for "cats" may be applied to a third hidden layer and a word feature vector of real numbers for a default word feature vector of real numbers may be applied to a fourth hidden layer. (Step 1100)

The DNVS 190 may also apply a plurality of word embedding vectors of real numbers for each sold domain name in the plurality of sold domain names 180 to the RNN 300. Each word embedding vector of real numbers 110 in the plurality of word embedding vectors of real numbers may be applied to a different hidden layer in the RNN 300. The sequence of s_tokens are preferably applied to the hidden layers in the same order the sequence of words appear in the sold domain name. (Step 1110)

Thus, for our example of "hatsforcats.com," the word embedding vector of real numbers 110 for "hats" may be applied to a first hidden layer, the word embedding vector of real numbers 110 for "for" may be applied to a second hidden layer, the word embedding vector of real numbers 110 for "cats" may be applied to a third hidden layer and a word embedding vector of real numbers 110 for a default word feature vector of real numbers, possibly comprising all random numbers, all 0's or all 1's, may be applied to the fourth hidden layer.

The DNVS 190 may apply a context embedding vector of real numbers 120 for each sold domain name in the plurality of sold domain names 180 to the NN 310. (Step 1120) Thus, for the example of "hatsforcats.com," the context embedding vector of real numbers 120 for "hatsforcats.com" may be applied to the NN portion of the ANN 160.

The DNVS 190 may apply a DNS embedding vector of real numbers 130 for each sold domain name in the plurality of sold domain names 180 to the NN 310. (Step 1130) Thus, for the example of "hatsforcats.com," the DNS embedding vector of real numbers 130 for "hatsforcats.com" may be applied to the NN portion of the ANN 160.

The DNVS 190 may apply a domain name features vector of real numbers 130 for each sold domain name in the plurality of sold domain names 180 to the NN 310. (Step 1200) Thus, for the example of "hatsforcats.com," the domain name features vector of real numbers 130 for "hatsforcats.com" may be applied to the NN portion of the ANN 160.

As a non-limiting example, at this point in the process of training the ANN 160, 160 inputs (40 inputs for each of four s_tokens) for the word features vector of real numbers 100 may be applied to various hidden layers in the RNN, 200 inputs (50 inputs for each of four s_tokens) for the word embedding vector of real numbers 110 may be applied to the various hidden layers in the RNN, four inputs for the context embedding vector of real numbers 120 may be applied to the NN portion of the ANN 160, 64 inputs for the DNS embedding vector of real numbers 130 may be applied to the NN portion of the ANN 160 and 91 inputs for the domain name features vector of real numbers 130 may be applied to the NN portion of the ANN 160.

The outputs of the ANN 160, which might, as a non-limiting example, comprise 1,000 or more outputs, may be used as inputs into a regression function 170 to predict a value of the sold domain name. (Step 1210) The DNVS 190 may determine an error by subtracting the predicted value from the actual sold value or by subtracting the actual sold value from the predicted value for the domain name (the selected method should always be used in both training and during actual of the ANN). (Step 1220) A plurality of weights to a plurality of inputs for a plurality of artificial neurons of the ANN 160 may be adjusted based on the calculated error. As non-limiting examples, the methods of gradient descent and backpropagation may be used to adjust the plurality of weights of the inputs to the plurality of artificial neurons of the ANN 160. (Step 1230)

This process may be repeated for every sold domain name in the plurality of sold domain names 180 and possibly for a plurality of the randomly created domain names assigned a minimal value. As all or the vast majority of the plurality of sold domain names 180 will have at least enough value for two parties to conduct a sale, the ANN 160 may not be properly trained on low value domain names unless the ANN 160 is also trained on randomly generated domain names having a very low quality (and thus assigned a very low value).

In addition, domain names having a very high sale price may also overwhelm the data so it may be desirable to assign all those domain names to a maximum value. As an example, an extremely valuable domain name, like "godaddy.com," if it were ever sold may be assigned to a value representing "greater than $25,000" without using the true sale price to avoid overwhelming all of the lower sales prices of sold domain names 180 in the training set 110.

When the desired percentage, as examples 80% or 100% of the sold domain names 180 in the plurality of sold domain names 180 have been used to train the ANN 160, this may be referred to as a single epoch. The DNVS 190 may repeat a plurality of epochs for the ANN 160 until the ANN 160 is able to predict values of sold domain names 180 within a desired accuracy or has reached a point where additional epochs are either not helping or are starting to hurt the performance of the ANN 160. (Step 1240) In another embodiment, only a batch or a sample of sold domain names in the plurality of sold domain names 180 are used for each epoch. While the batch or the sample of sold domain names may be any size up to the maximum number of sold domain names in the plurality of sold domain names, in a preferred non-limiting embodiment, each batch or sample for an epoch comprises 16 to 512 sold domain names that were randomly selected. Each batch or sample of sold domain names may be used for one step of gradient descent. The batches or samples may overlap, meaning the batches or samples may comprise sold domain names that were included in past or future batches. In preferred embodiments, the randomly selected sold domain names for the batch or sample are not selected from any sold domain names that are set aside to be used for testing of the ANN 160.

Determining a Predicted Value of a Target Domain Name

Figure 13:
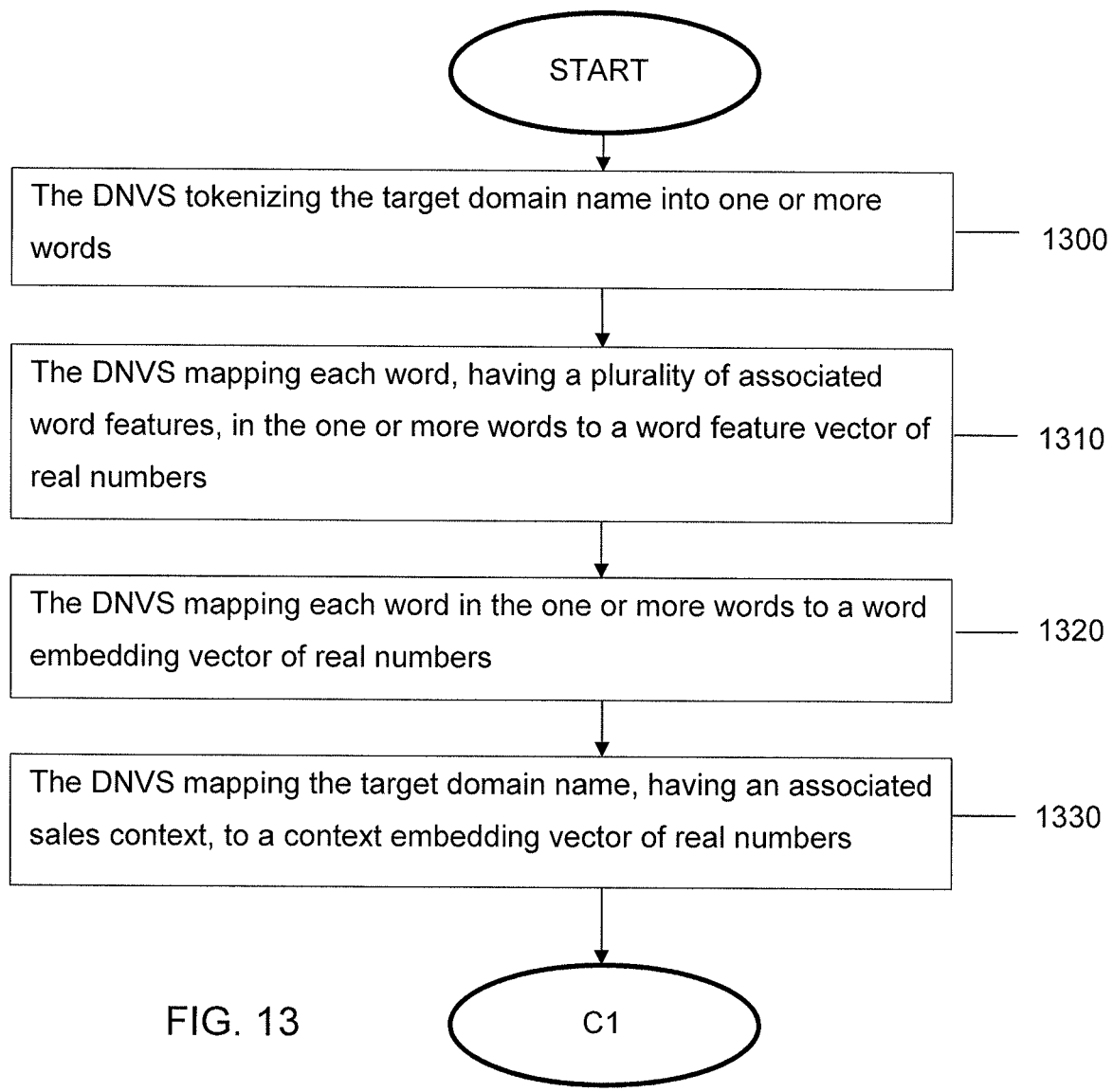
FIGS. 13-15 are flowcharts illustrating a process of using a trained ANN to value one or more target domain names.
Figure 14:
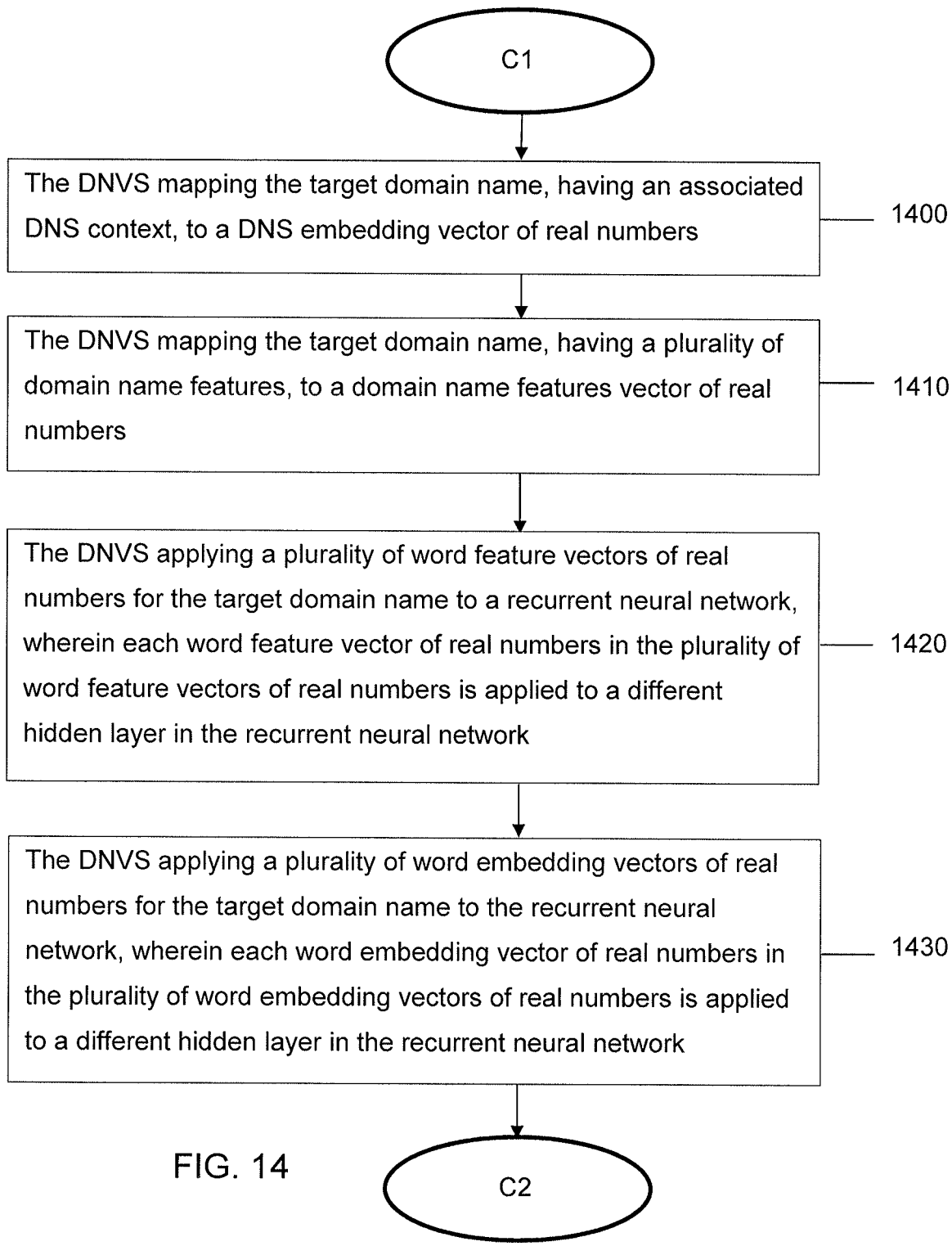
Figure 15:
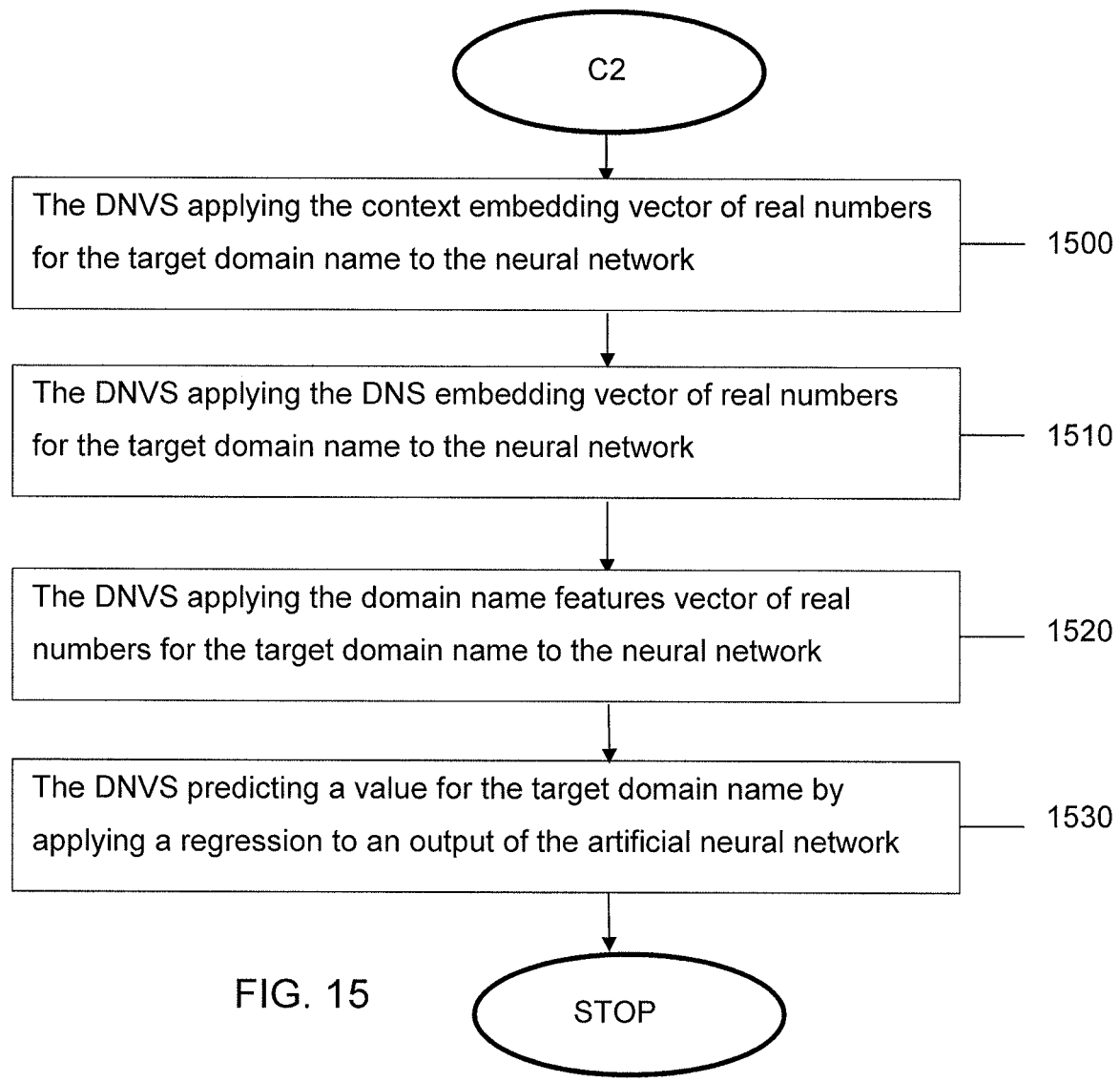

Referring to FIGS. 13-15, a method will now be discussed for a DNVS 190 to use an ANN 160 to value a target domain name. The method starts by identifying a target domain name for which a predicted future sale price or value is desired. The target domain name may be received from any source or generated using any desired means.

As a non-limiting example, the target domain name may have been generated by a domain name registrar, possibly based on information received from a customer (potential future domain name registrant) or information found online regarding the customer. As another example, the customer may have entered the target domain name into a field on a website of the domain name registrar designed for this purpose. As another example, the target domain name may be one of many domain names owned by a domain name registrant that wishes to know the value of that target domain name and possibly the rest of the domain names in the domain name registrant's domain name portfolio. As another example, the domain name may be registered to a domain name registrant that wishes to know a value of the target domain name so that the domain name registrant may use that information in selecting a price at which to offer the target domain name for sale. As another example, a potential domain name registrant may want to know a value of a domain name 175 that the potential domain name registrant should offer or pay for the target domain name. As another example, a domain name registrar may desire to know the value of a target domain name to determine whether or not to display the domain name to a customer (the higher the value the more likely to display) or how prominently to display the target domain name to the customer.

Once the target domain name has been identified or received, it is preferably processed as closely as possible to the process each sold domain name in the plurality of sold domain names 180 was processed during the creation of the training set 110 and during the training of the ANN 160. Thus, the process of valuing a target domain name will mirror very closely the processes used in creating the training set 110 and the processes used in training the ANN 160 with each sold domain name in the plurality of sold domain names 180.

The process starts by tokenizing the target domain name into one or more words. (Step 1300) The same methods and rules used to tokenize the sold domain names 180 into one or more s_tokens are also preferably used to tokenize the target domain name into one or more words. Any desired number of words (preferably consistent with that used during the training of the ANN 160) may be tokenized and used as part of the process. As mentioned during the section dealing with creating the training set 110, some embodiments may have a maximum number of words, such as up to four words, that are used. In preferred embodiments, the order of selection is first word, last word, second word, third word, fourth word, and so on. Thus, if more than four words were tokenized from the target domain name, the first, last, second and third may be selected for further processing.

The DNVS 190 may map each word tokenized from the target domain name to a word feature vector of real numbers. (Step 1310) As an example, if the DNVS 190 is attempting to value the target domain name of "hatsfordogs.com," this target domain name may be tokenized into the words "hats," "for" and "dogs." The DNVS 190 may then map each of these words to a word feature vector of real numbers. Assuming in this example that "hatsforcats.com" was previously sold and tokenized into the s_tokens of "hats," for" and "cats," the DNVS 190 would already have each of the words "hats," "for" and "cats" (among all the other s_tokens from the plurality of s_tokens) mapped to a word feature vector of real number in the training set 110 and in the database. Continuing with this example, the words "hats" and "for" may each be mapped to a word feature vector of real numbers previously used for those words in the sold domain name. The word of "dogs" might have been used in a different sold domain name (perhaps "dogsarethebest.net") and the word feature vector of real numbers determined for the word "dogs" when it was found in a sold domain name may be used for the word "dogs" in the new target domain name. If the target domain name is tokenized into a word never before used in any previous sold and/or registered domain name, the DNVS 190 may determine a word features vector of real numbers 100 for the never before seen word using the same process used to assign s_tokens to word features vector of real numbers 100.

In another embodiment, the DNVS 190 may determine, from scratch, a word features vector of real numbers 100 for each tokenized word in the target domain name and map each word to the newly determined word features vector of real numbers 100. The DNVS 190 preferably uses the same methods of determine the word features vector of real numbers 100 for each word in the target domain name as the DNVS 190 used in assigning word feature vectors of real numbers to each of the s_tokens in the plurality of s_tokens.

The DNVS 190 may also map each word in the one or more words tokenized from the target domain name to a word embedding vector of real numbers 110 using the same methods used to make the one or more words tokenized from the target domain name to a word features vector or real numbers. (Step 1320) As an example, if a s_token was "cats" and "cats" was mapped to a word embedding vector of real numbers 110, the word "cats" from the target domain name is preferably mapped to the same word embedding vector of real numbers 110. Tokenized words from target domain names that are not found in any of the sold domain names 180 used to create the plurality of word embedding vectors of real numbers may be assigned a default word embedding vector of real numbers 110, which may be all "0's," all "0.5's," all "1's," all random numbers or any other desired default values.

The DNVS 190 may map unknown s_tokens and r_tokens to a set of generic tokens based on 1) length and/or 2) word vs number vs mixed of the unknown s_tokens or r_tokens. As non-limiting examples, an unknown s_token or r_token of "wuq" may be mapped to a generic token of "unknown 3 letter word," while an unknown s_token or r_token of "46735" may be mapped to a generic token of "unknown 5 digit number," and "srzqzrppwwcv" may be mapped to a generic token of "unknown 6+ letter word." Each of the generic tokens may receive a single word embedding.

The DNVS 190 may also map the target domain name, having an associated sales context, to a context embedding vector of real numbers 120. (Step 1330) The associated sales context comprises a location and optionally a time of a hypothetical sale of the target domain name. The person or entity using the DNVS 190 may select one or more different associated sales contexts or one or more default associated sales contexts may be selected for the user. The DNVS 190 may then, one at a time, determine a predicted value of a hypothetical sale at each of the selected associated sales context.

It should be appreciated that all of the other vectors of real numbers may remain the same, but different context embedding vectors of real numbers may be used to determine the different predicted values at each selected associated sales context. While a default time of the current time may be used, the person or entity using the DNVS 190 may elect or be enabled to select a time in the past, current or future to be associated with the predicted value of the target domain name. If more than one associated sales context is entered or selected by the user, the DNVS 190 may assign different context embedding vectors of real numbers to the target domain name and process the different context embedding vectors of real numbers one at a time through the ANN 160 (while all the other vectors of real numbers stay the same). The DNVS 190 may then display for, or transmit to, a user on a client device one or more predicted values specifically determined for each of the selected associated sales contexts comprising a where and optionally a when.

The DNVS 190 may also map the target domain name, having an associated DNS context, to a DNS embedding vector of real numbers 130 using as close as possible the same methods and methodologies used to determine the DNS embedding vector of real numbers 130 for each sold domain name in the plurality of sold domain names 180. (Step 1400)

The DNVS 190 may also map the target domain name, having a plurality of domain name features, to a domain name features vector of real numbers 130 using as close as possible the same methods and methodologies used to determine the domain name features vector of real numbers 130 for each sold domain name in the plurality of sold domain names 180. (Step 1410)

The DNVS 190 may apply a plurality (preferably up to four, although other numbers may be used) of word feature vectors of real numbers for the target domain name to a RNN. (Step 1420) Each word feature vector of real numbers in the plurality of word feature vectors of real numbers may be applied to a different hidden layer in the RNN. Thus, if the target domain name is "hatsfordogs.com," the word features vector of real numbers 100 for "hats" may be applied to the first hidden layer, the word features vector of real numbers 100 for "for" may be applied to the second hidden layer, the word features vector for "dogs" may be applied to the third hidden layer and a default word feature vector of real numbers for a nonexistent fourth word may be applied to the fourth hidden layer.

The DNVS 190 may also apply a plurality (preferably up to four, although other numbers may be used) of word embedding vectors of real numbers for the target domain name to the RNN. (Step 1430) Each word embedding vector of real numbers 110 in the plurality of word embedding vectors of real numbers may be applied to a different hidden layer in the RNN. Thus if the target domain name is "firstsecondthirdfourthfifth.org," the word embedding vector of real numbers 110 for "first" may be applied to the first hidden layer, the word embedding vector of real numbers 110 for "second" may be applied to the second hidden layer, the word embedding vector of real numbers 110 for "third" may be applied to the third hidden layer, the word embedding vector of real number for "fourth" may be applied to the fourth hidden layer and the word embedding vector of real numbers 110 for "fifth" is preferably not used.

The DNVS 190 may apply the context embedding vector of real numbers 120 for the target domain name to the NN 310. (Step 1500) If the user of the DNVS 190 desires to have an estimated value of the target domain name customized based on different domain name sales platforms or different sale dates, the DNVS 190 may apply a plurality of context embedding vectors of real numbers, one at a time, to the ANN 160 to receive a customized value of the target domain name tied to each different domain name sales platform and/or sales date.

The DNVS 190 may apply the DNS embedding vector of real numbers 130 for the target domain name to the NN 310. (Step 1510) As with each sold domain name used to create the training set 110 used to train the ANN 160, the DNVS 190 may access WHOIS data, nameserver information and/or other online sources to retrieve DNS information regarding the target domain name.

The DNVS 190 may apply the domain name features vector of real numbers 130 for the target domain name to the NN 310. (Step 1520) As with the sold domain names 180, the DNVS 190 may perform various tests on the target domain name to determine the same domain name features for the target domain name that were performed on each sold domain name in the plurality of sold domain names 180 used to create the training set 110 used to train the ANN 160.

At this point in the process, there are preferably four word feature vectors of real numbers applied to the RNN (each at an assigned hidden layer) of the ANN 160, there are preferably four word embedding vectors of real numbers applied to the RNN (each at an assigned hidden layer) of the ANN 160, there is a context embedding vector of real numbers 120 applied to the NN of the ANN 160, there is a DNS embedding vector of real numbers 130 applied to the NN of the ANN 160, and there is a domain name features vector or real numbers applied to the NN of the ANN 160, all at the same time. The outputs of the RNN (200 is a non-limiting example) are preferably connected to the NN of the ANN 160. The NN of the ANN 160 may then have a plurality (1,000 as a non-limiting example) of outputs connected to a regression function 170. A value for the target domain name may be predicted or determined by applying the regression function 170 to the plurality of outputs of the ANN 160. (Step 1530)

Using the Value of the Target Domain Name

Figure 16:
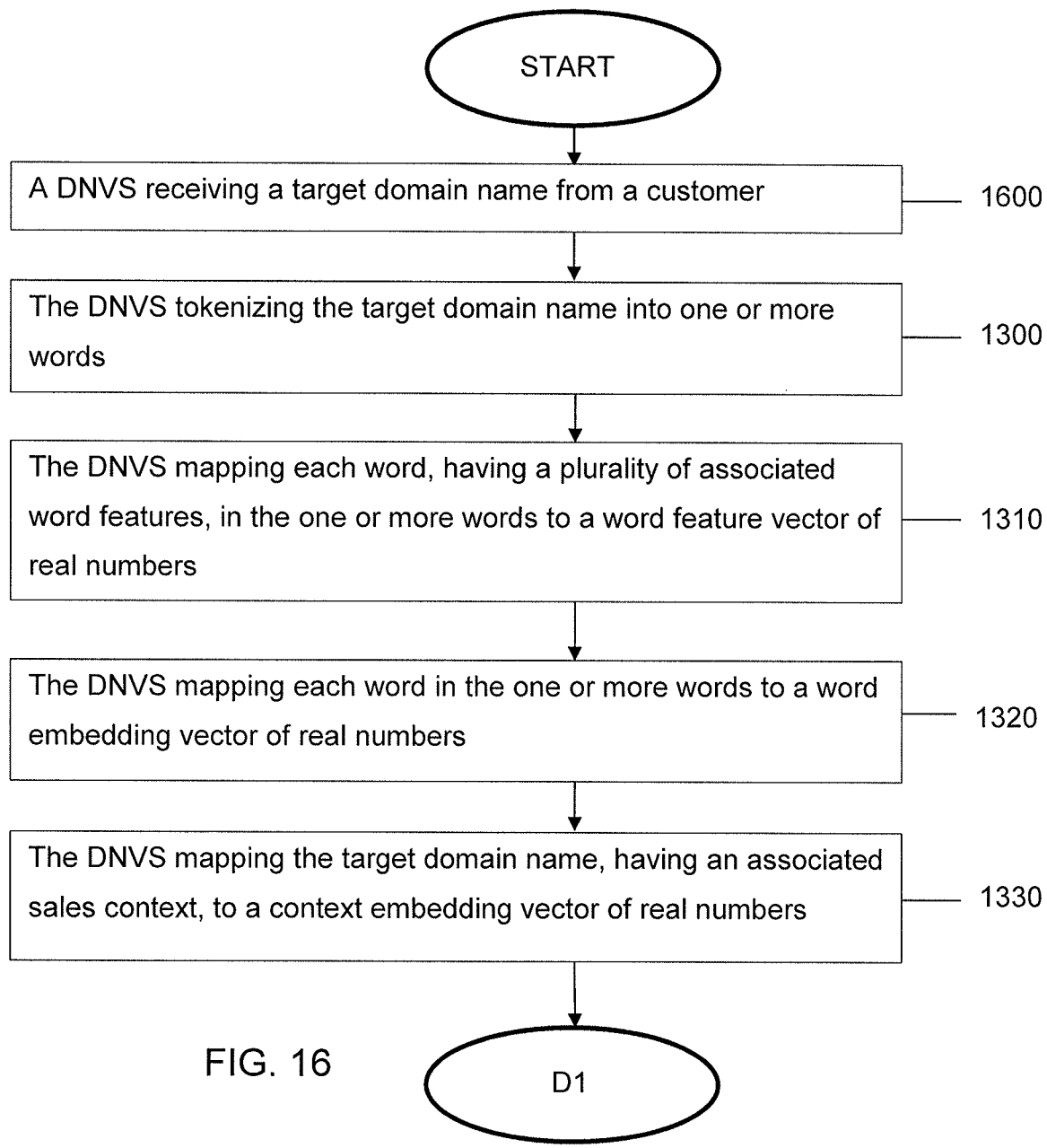
FIGS. 16-18 are flowcharts illustrating a process of using a value for one or more target domain names determined by an ANN.
Figure 17:
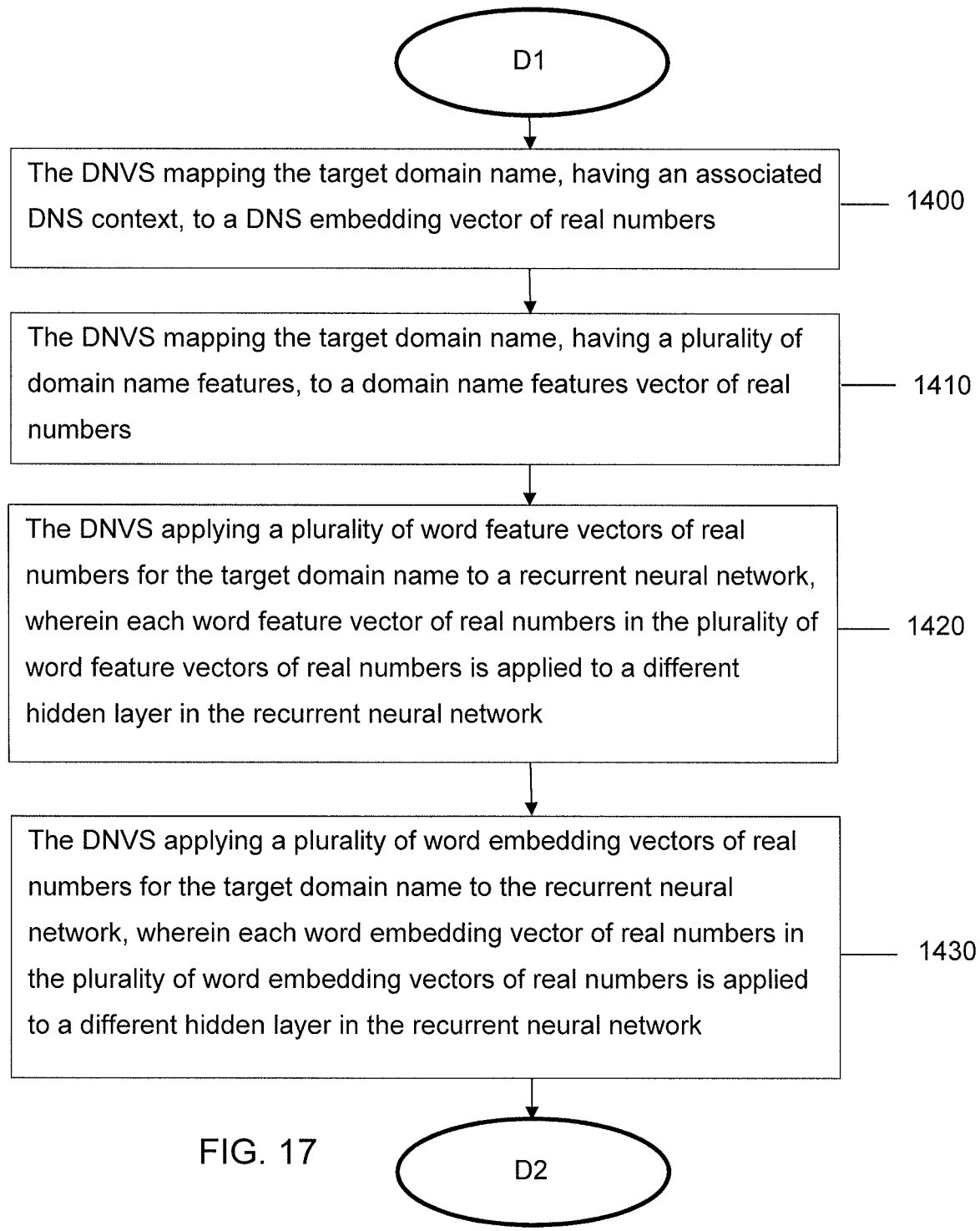
Figure 18:
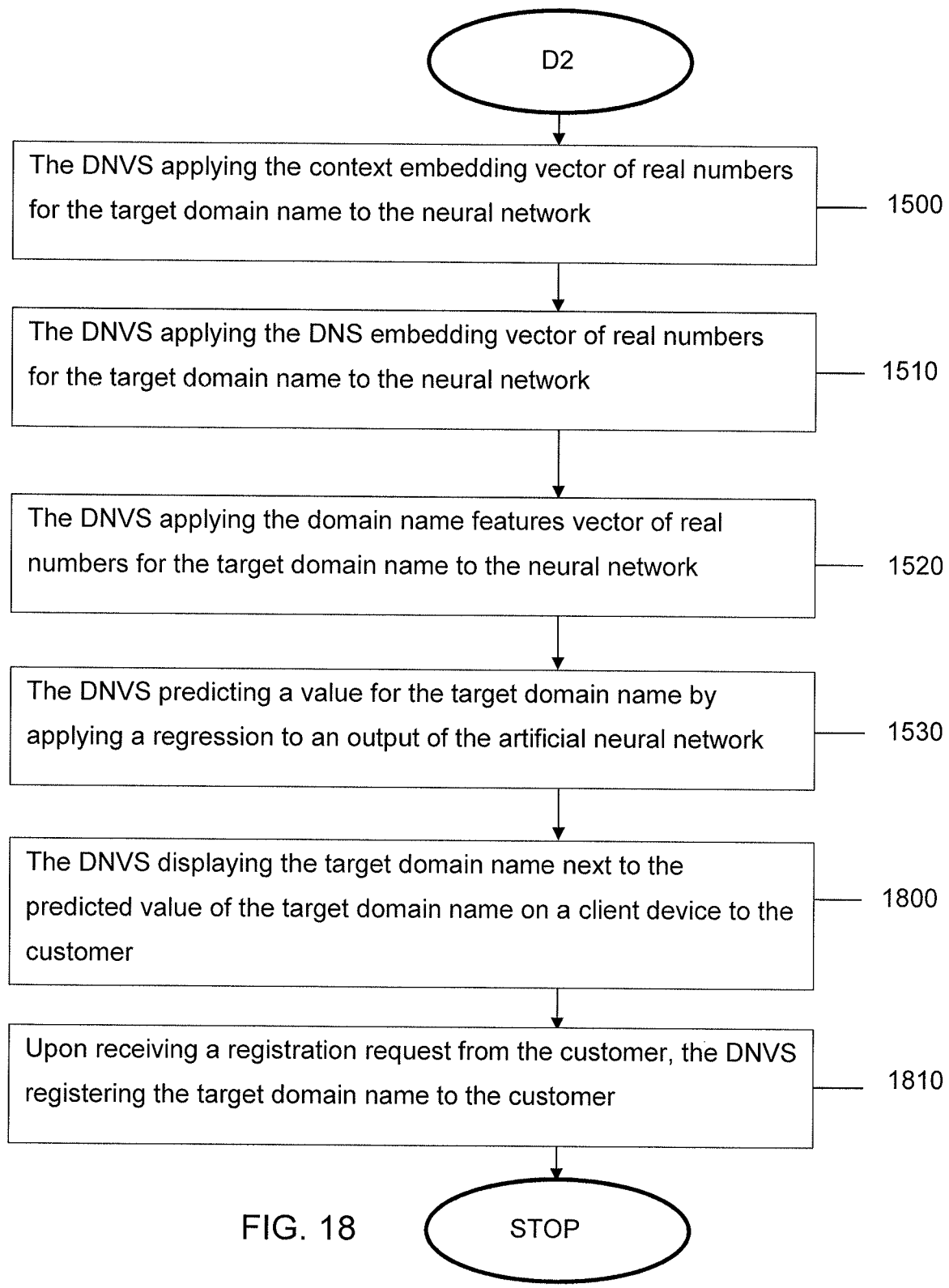

Referring to FIGS. 16-18, the DNVS 190 may generate or receive a target domain name from a user or customer and value the domain name as previously described. (Step 1600) In some embodiments, the regression function 170 may also determine an uncertainty level for the value of the domain name. As an example, the DNVS 190 may determine that sold domain names 180 that were similar to the target domain name all sold within a small range of sale prices, providing greater confidence in the estimated value and a smaller uncertainty level for the value of the target domain name. As another example, the DNVS 190 may determine that the sold domain names 180 that were similar to the target domain name all sold within a large range of sales prices (or perhaps there are very few comparable domain names), providing less confidence in the estimated value and a larger uncertainty level for the value of the target domain name. Thus, the ANN 160 may be trained to return a range of values, a value and an associated uncertainty of the value and/or a plurality of values with each value being associated with a particular sales platform (and possibly a date) that the target domain name is hypothetically sold at.

In some embodiments, the DNVS 190 may display the target domain name next to the predicted value of the target domain name on a client device used by the customer and upon receiving a registration request from the customer, registering the target domain name to the customer. (Step 1800)

In some embodiments, the DNVS 190 may determine a value for a plurality of different target domain names and only display the target domain names having values higher than the target domain names having relatively lower values. In some situations, the DNVS 190 may want to display, as a non-limiting example, five domain names to a user so the DNVS 190 may select the five target domain names having the greatest predicted value. In other situations, the user may want to see the cheapest available domain names and in this case the DNVS 190 may only display, as a non-limiting example, the five target domain names that have the lowest value and not displaying (or displaying lower or in a less noticeable region) the higher value domain names.

In some embodiments, the target domain name may be available for domain name registration. Upon the DNVS 190 receiving a registration request from a user, the DNVS 190 may register the target domain name to the domain name registrant. (Step 1810)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising the steps of:
receiving, by a processor of a computing device, a target domain name from a customer;
tokenizing, by the processor of the computing device, the target domain name into a plurality of words;
mapping, by the processor of the computing device, each word of the plurality of words to a word feature vector of real numbers to form a plurality of word feature vectors of real numbers;
mapping, by the processor of the computing device, each word of the plurality of words to a word embedding vector of real numbers to form a plurality of word embedding vectors of real numbers;
inputting, by the processor of the computing device, into a recurrent neural network,
for a first word of the plurality of words,
a first corresponding word feature vector of real numbers of the plurality of word feature vectors of real numbers, and
a first corresponding word embedding vector of real numbers of the plurality of word embedding vectors of real numbers, and
for a second word of the plurality of words,
a second corresponding word feature vector of real numbers of the plurality of word feature vectors of real numbers, and
a second corresponding word embedding vector of real numbers of the plurality of word embedding vectors of real numbers,
wherein the first corresponding word feature vector of real numbers, the first corresponding word embedding vector of real numbers, the second corresponding word feature vector of real numbers, and the second corresponding word embedding vector of real numbers are inputted concurrently with one another,
assigning, by the processor of the computing device, a value to each word feature vector of real numbers of the plurality of word feature vectors of real numbers flowing through the recurrent neural network based on the mapping of each word of the plurality of words to the target domain name; and
applying, by the processor of the computing device, each word embedding vector of real numbers of the plurality of word embedding vectors of real numbers for the target domain name to the recurrent neural network based on the assigned value of the corresponding word feature vector of real numbers of the plurality of word feature vectors of real numbers.

2. The method of claim 1, further comprising:
mapping, by the processor of the computing device, the target domain name, having an associated sales context, to a context embedding vector of real numbers;
mapping, by the processor of the computing device, the target domain name, having an associated Domain Name System (DNS) context, to a DNS embedding vector of real numbers;
mapping, by the processor of the computing device, the target domain name, having a plurality of domain name features, to a domain name features vector of real numbers;
applying, by the processor of the computing device, the context embedding vector of real numbers for the target domain name to a separate neural network;
applying, by the processor of the computing device, the DNS embedding vector of real numbers for the target domain name to the separate neural network;
applying, by the processor of the computing device, the domain name features vector of the numbers for the target domain name to the separate neural network;
determining, by the processor of the computing device, at least one frequency associated with the target domain name based on the application of the domain name features vector of the number for the target domain name and the assigned values to each word feature vector of real numbers of the plurality of word feature vectors of real numbers which is associated with the mapped target domain name;
wherein the at least one frequency corresponds to a tendency of use of words within the target domain name; and
predicting, by the processor of the computing device, a frequency value for the target domain name by applying a regression function to an output,
wherein the frequency value is a tokenized target domain name.

3. The method of claim 2, further comprising:
selecting, by the processor of the computing device, for continued use, the target domain name based on the frequency value associated with the target domain name exceeding a predetermined frequency threshold.

4. The method of claim 3, further comprising:
displaying, by the processor of the computing device, the target domain name next to the predicted value of the target domain name on a client device to the customer.

5. The method of claim 4, further comprising:
upon receiving a registration request from the customer, registering, via the processor of a computing device, the target domain name to the customer.

6. The method of claim 5, further comprising the steps of:
tokenizing, by the processor of the computing device, the target domain name into a first set of words of the plurality of words, and
a second set of words of the plurality of words,
wherein the second set of words is different from the first set of words;
determining, by the processor of the computing device, a first frequency the words in the first set of words appears in a title, a tag and/or a text of a website pointed to by the target domain name;
determining, by the processor of the computing device, a second frequency the words in the second set of words appears in the title, the tag and/or the text of the website pointed to by the target domain name; and selecting, by the processor of the computing device, for continued use either the first set of words or the second set of words based on the first frequency and the second frequency.

7. The method of claim 5,
wherein each word of the plurality of words has a plurality of associated words features, and
wherein the plurality of associated word features for each word of the plurality of words comprises at least one of:
whether the word is in an English dictionary,
whether the word is in a places dictionary,
whether the word is in a name dictionary,
a popularity of the word in a selected body of text and
a number of letters in the word.

8. The method of claim 5, wherein the associated context embedding for the target domain name comprises a name of an online platform where a hypothetical sale of the target domain name would occur.

9. The method of claim 5, wherein the plurality of domain name features for the target domain name comprises at least one of:
a number of words in the target domain name, a number of dashes in the target domain name, a number of vowels in the target domain name, a number of consonants in the target domain name, and a number of numbers in the target domain name.

10. The method of claim 5, wherein the plurality of domain name features for the target domain name comprises at least one of:
a number of words in the target domain name, and a number of letters in the target domain name.

11. The method of claim 5,
wherein each word of the plurality of words has a plurality of associated words features, and
wherein the plurality of associated word features for each word of the plurality of words comprises:
whether the word is in an English dictionary,
whether the word is in a places dictionary,
whether the word is in a name dictionary,
a popularity of the word in a selected body of text and
a number of letters in the word.

12. The method of claim 5, wherein the plurality of domain name features for the target domain name comprises:
a number of words in the target domain name, a number of dashes in the target domain name, a number of vowels in the target domain name, a number of consonants in the target domain name, and a number of numbers in the target domain name.

13. The method of claim 5, wherein the plurality of domain name features for the target domain name comprises:
a number of words in the target domain name, and a number of letters in the target domain name.

\* \* \* \* \*